(12) United States Patent
Kinsey et al.

(10) Patent No.: US 12,508,376 B2
(45) Date of Patent: Dec. 30, 2025

(54) DRY POWDER INHALER

(71) Applicant: MannKind Corporation, Valencia, CA (US)

(72) Inventors: P. Spencer Kinsey, Sandy Hook, CT (US); Brendan Laurenzi, Rutland, MA (US); Chad C. Smutney, Watertown, CT (US); Benoit Adamo, South Salem, NY (US); Joseph Guarneri, Stamford, CT (US)

(73) Assignee: MannKind Corporation, Valencia, CA (US)

( * ) Notice: Subject to any disclaimer, the term of this patent is extended or adjusted under 35 U.S.C. 154(b) by 322 days.

(21) Appl. No.: 16/601,440

(22) Filed: Oct. 14, 2019

(65) Prior Publication Data

US 2020/0046917 A1 Feb. 13, 2020

Related U.S. Application Data

(63) Continuation of application No. 15/418,388, filed on Jan. 27, 2017, now abandoned.
(Continued)

(51) Int. Cl.
*A61M 15/00* (2006.01)
*A61K 9/00* (2006.01)
(Continued)

(52) U.S. Cl.
CPC ....... *A61M 15/0021* (2014.02); *A61K 9/0075* (2013.01); *A61K 9/1617* (2013.01); *A61K 31/495* (2013.01); *A61K 31/658* (2023.05); *A61K 31/661* (2013.01); *A61M 15/0025* (2014.02); *A61M 15/0028* (2013.01); *A61M 15/0045* (2013.01); *A61M 15/0091* (2013.01); *A61K 31/137* (2013.01); *A61K 31/473* (2013.01); *A61K 31/5575* (2013.01); *A61M 2202/064* (2013.01); *A61M 2205/10* (2013.01);
(Continued)

(58) Field of Classification Search
CPC .......... A61M 15/0021; A61M 15/0025; A61M 15/0028; A61M 15/0045; A61M 15/0091
See application file for complete search history.

(56) References Cited

U.S. PATENT DOCUMENTS

| | | | |
|---|---|---|---|
| 10,376,525 B2 | 8/2019 | Olschewski et al. | |
| 2002/0034477 A1* | 3/2002 | Edwards | A61K 9/0075 424/43 |

(Continued)

FOREIGN PATENT DOCUMENTS

| | | | | |
|---|---|---|---|---|
| WO | WO-2015010092 A1 * | 1/2015 | .......... | A61K 31/198 |
| WO | 2016133863 A1 | 8/2016 | | |

*Primary Examiner* — Courtney B Fredrickson
(74) *Attorney, Agent, or Firm* — K&L Gates LLP; Brian J. Novak; Hal Gibson

(57) ABSTRACT

A dry powder inhaler including replaceable cartridges containing a dry powder for local or systemic delivery through the pulmonary tract and lungs is disclosed. The inhalers are used with inhalable dry powders, including medicament formulations comprising active agents for local or systemic delivery and for the treatment of diseases such as, pulmonary hypertension, cardiovascular disease, anaphylaxis, diabetes, obesity, cancer, and other diseases, or symptoms associated with these and other diseases, such as nausea, vomiting, pain and inflammation.

11 Claims, 20 Drawing Sheets

Related U.S. Application Data

(60) Provisional application No. 62/289,095, filed on Jan. 29, 2016.

(51) Int. Cl.
*A61K 9/16* (2006.01)
*A61K 31/00* (2006.01)
*A61K 31/495* (2006.01)
*A61K 31/661* (2006.01)
*A61K 31/137* (2006.01)
*A61K 31/473* (2006.01)
*A61K 31/5575* (2006.01)

(52) U.S. Cl.
CPC . *A61M 2205/121* (2013.01); *A61M 2205/128* (2013.01); *A61M 2205/583* (2013.01); *A61M 2206/14* (2013.01); *A61M 2207/00* (2013.01)

(56) References Cited

U.S. PATENT DOCUMENTS

| | | | | |
|---|---|---|---|---|
| 2007/0196503 | A1* | 8/2007 | Wilson | A61K 9/145 424/499 |
| 2009/0305964 | A1* | 12/2009 | Schambye | A61P 1/14 514/21.4 |
| 2011/0105719 | A1* | 5/2011 | Gandhi | B01J 19/0066 530/308 |
| 2013/0104887 | A1* | 5/2013 | Smutney | A61M 15/0028 128/203.15 |
| 2013/0243828 | A1* | 9/2013 | Lipp | A61P 11/00 424/400 |
| 2013/0291866 | A1* | 11/2013 | Smutney | A61K 38/26 128/203.15 |
| 2017/0232210 | A1* | 8/2017 | Boeckl | A61P 25/22 128/203.15 |
| 2021/0085897 | A1* | 3/2021 | Gupta | A61M 15/0026 |

\* cited by examiner

DRY POWDER INHALER

CROSS REFERENCE TO RELATED APPLICATIONS

This application is a continuation of U.S. Ser. No. 15/418,388, filed Jan. 27, 2017, which claims benefit under 35 U.S.C. § 119(e) from U.S. Provisional Patent Application Ser. No. 62/289,095, filed Jan. 29, 2016, the contents of which are incorporated herein by reference in their entirety.

TECHNICAL FIELD

The present disclosure relates to dry powder inhalers with replaceable cartridges comprising a dry powder for local or systemic delivery of an active ingredient to and/or through the lungs. The inhalers are used with inhalable dry powders, including primarily, medicament formulations comprising an active agent or an active ingredient for the treatment of diseases such as, pulmonary hypertension, cardiovascular disease, diabetes, obesity, and cancer, or symptoms associated with these and other diseases, for example, nausea, vomiting, pain, and inflammation.

All references cited in this specification, and their references, are incorporated by reference herein in their entirety where appropriate for teachings of additional or alternative details, features, and/or technical background.

BACKGROUND

Drug delivery to lung tissue has been achieved using a variety of devices for inhalation, including nebulizers and inhalers, such as metered dose inhalers and dry powder inhalers to treat local disease or disorders. Dry powder inhalers used to deliver medicaments to the lungs contain a dose system of a powder formulation usually either in bulk supply or quantified into individual doses stored in unit dose compartments, like hard gelatin capsules or blister packs. Bulk containers are equipped with a measuring system operated by the patient in order to isolate a single dose from the powder immediately before inhalation.

Dosing reproducibility with inhalers requires that the drug formulation is uniform and that the dose be delivered to a subject with consistency and reproducible results. Therefore, the dosing system ideally should operate to completely discharge all of the formulation effectively during an inspiratory maneuver when the patient is taking his/her dose. However, complete powder discharge from the inhaler is not required as long as reproducible dosing can be achieved. Flow properties of the powder formulation, and long term physical and mechanical stability in this respect, are more critical for bulk containers than they are for single unit dose compartments. Good moisture protection can be achieved more easily for unit dose compartments such as blisters. However, the materials used to manufacture the blisters allow air into the drug compartment and subsequently, the formulation loses viability with prolonged storage, particularly if the formulation to be delivered is hygroscopic. The ambient air permeating through the blisters carries in humidity that destabilizes the active ingredient. Additionally, dry powder inhalers which use blisters to deliver a medicament by inhalation can suffer with inconsistency of dose delivery to the lungs due to variations in geometry of the air conduit architecture resulting from puncturing films or peeling films of the blisters.

Dry powder inhalers can be breath activated or breath-powered and can deliver drugs by converting drug particles in a carrier into a fine dry powder which is entrained into an air flow and inhaled by the patient. Drugs delivered with the use of a dry powder inhaler for local lung delivery to treat allergy, asthma and/or chronic obstructive pulmonary disease (COPD), include, multi-dose inhalers such as FLOVENT® DISKUS, ADVAIR® DISKUS, and PULMICORT® FLEXHALER to name a few. Dry powder inhalers are no longer only intended to treat pulmonary disease, but can also be used to treat systemic disease so that the drug is delivered to the lungs and absorbed into the systemic circulation. For example, the AFREZZA® inhaler is a unit dose dry powder inhaler, which delivers a human insulin formulation for the treatment of diabetes in humans. AFREZZA was approved by the U.S. Food and Drug Administration for the treatment of diabetes type 1 and type 2 in June 2014. The AFREZZA inhaler is a breath-actuated, multiple use inhaler which delivers a single dose of insulin contained in a cartridge to the lungs, wherein the insulin is absorbed into the circulation for the effective treatment of hyperglycemia associated with diabetes. Accordingly, dry powder inhalers can be used to effectuate safe delivery of other active agents to the systemic circulation to treat an array of diseases or disorders which include, but not limited to cancer, diabetes, obesity, cardiovascular disease, neurodegenerative disease or disorder, etc., and symptoms of such diseases or disorders, including pain, headaches, nausea, vomiting, tremors, infection, and the like.

Dry powder inhalers such as those described in U.S. Pat. Nos. 7,305,986, 7,464,706, 8,499,757 and 8,636,001, which disclosures are incorporated herein by reference in their entirety, can generate primary drug particles, or suitable inhalation plumes during an inspiratory maneuver by deagglomerating the powder formulation within a capsule or cartridge comprising a single dose. The amount of fine powder discharged from the inhaler's mouthpiece during inhalation is largely dependent on, for example, the interparticulate forces in the powder formulation and the efficiency of the inhaler to separate those particles so that they are suitable for inhalation. The benefits of delivering drugs via the pulmonary circulation are numerous and include rapid entry into the arterial circulation, avoidance of drug degradation by liver metabolism, and ease of use without discomfort.

Some dry powder inhaler products developed for pulmonary delivery have met with some success to date. However, due to lack of practicality and/or cost of manufacture, there is room for improvement. Some of the persistent problems observed with prior art inhalers, include lack of device ruggedness, inconsistency in dosing, inconvenience of the equipment, poor deagglomeration, problems with delivery in light of divorce from propellant use, high manufacturing costs, and/or lack of patient compliance. Therefore, the inventors have identified the need to design and manufacture inhalers with consistent improved powder delivery properties, easy to use, and having discrete configurations which would allow for better patient compliance.

SUMMARY

The present disclosure is directed to dry powder inhalers with replaceable cartridges comprising a dry powder for inhalation for delivery to the lungs for local or systemic delivery into the pulmonary circulation. The dry powder inhaler is a breath-powered inhaler which is compact, reusable or disposable, has various shapes and sizes, and comprises a system of airflow conduit pathways for the effective and rapid delivery of powder medicament to the lungs and the systemic circulation.

In one embodiment, the dry powder inhaler comprises a unit dose cartridge, and a dry powder formulation that is to be aerosolized and delivered to lung tissue for a local tissue effect, or for absorption into the blood stream in the lungs and be delivered by the systemic circulation to target tissue or organs of a subject. In an embodiment, the dry powder can comprise, a carrier molecule, including pharmaceutically acceptable carriers and excipients, for example, phospholipids, polymers such as polyethylene glycol, co-glycolides, a saccharide, a polysaccharide, or a diketopiperazine, and an active ingredient such as peptides and proteins, and small molecules, including, neurotransmitters.

In one embodiment, the dry powder inhaler is reusable and is provided with a replaceable cartridge for single use to deliver a single dose using a single inhalation provided by a subject. In this embodiment, multiple cartridges of a specific powder content containing an active ingredient and packaged, for example, in a blister pack can be provided with a single inhaler for multiple uses by a subject. In this and other embodiments, a cartridge can comprise a dry powder formulation for treating a variety of conditions, diseases or disorders including, bacterial infections such as methicillin-resistant *Staphylococcus aureus*; pulmonary aspergillosis, lung transplant, pulmonary arterial hypertension (PAH), osteoporosis, obesity, anaphylaxis or symptoms thereof, neutropenia, chronic obstructive pulmonary disease (COPD), asthma, allergy, or symptom of a disease or disorder including acute or chronic pain, nausea and vomiting including chemotherapy-induced nausea and vomiting, migraines; nervous systems disorders and diseases, including dementia, Alzheimer's, depression, Parkinson's, multiple sclerosis or symptoms thereof, and the like.

In one embodiment, the dry inhaler comprises a body, a housing, and a mouthpiece configured with the body, wherein the body comprises a mounting area for a cartridge, and the body and the housing are movable relative to one another in a linear or angular motion and at least a portion of the body and the housing are operably configured to engage one another, for example, by insertion, to attain a closed position and effectuate a cartridge positioned in the mounting area to be reconfigured to attain an airflow pathway for discharging a powder dose contained in the cartridge. In embodiments herewith, the cartridge is made of rigid materials and comprises a cup and a lid which are moveable relative to one another in a translational motion.

In an example embodiment, a dry powder inhaler comprising a body, a housing, a cartridge and a mouthpiece is provided, wherein the inhaler body has a mounting area for the cartridge and the cartridge comprises a dry powder composition comprising microcrystalline particles of fumaryl diketopiperazine and a drug, and wherein said housing translationally glides over the inhaler body in a proximal to distal direction to open the inhaler, or from a distal to proximal direction to close the inhaler, and wherein when the inhaler is closed the inhaler has one or more rigid air conduits for dispensing the dry powder.

In another embodiment, the dry powder inhaler comprises a body, a lid, and a mouthpiece; wherein the mouthpiece and the lid are configured as one unit and are moveable on the inhaler body by an angular rotation of the mouthpiece relative to the body. In this and other embodiments, the body comprises a distal end, a proximal end, a bottom surface, a top surface, an interior surface, a cartridge mounting area, and an opening in the top surface for accessing the interior of the device and the cartridge mounting area; wherein the mouthpiece is configured to have wing-like structures extending on a vertical plane to the mouthpiece air conduit to form a cover or lid-like structure in the shape of a saddle-like structure, which upon rotation from a vertical angle to a horizontal plane, the mouthpiece forms a lid over the open area of the top surface to effectuate closing of the inhaler and form part of the top portion of the inhaler. In the closed configuration, a cartridge loaded onto the cartridge mounting area is translated from a containment position to a dosing position so that an air conduit is form through the cartridge and powder in the cartridge can be emitted from the inhaler upon an inhalation maneuver. In one aspect of this embodiment, the mouthpiece is configured to have a mechanism for engaging with the cartridge mounting assembly to effectuate reconfiguration of the cartridge from containment to dosing configuration. In one embodiment, the interior surface of the inhaler comprises projections at the cartridge mounting area designed to hold a cartridge cup upon loading a cartridge. In one embodiment, the mechanism for engaging the cartridge mounting area comprises a gear and a rack, which pivot the inhaler mouthpiece portion away from the inhaler body and into a vertical position to the inhaler body in a horizontal plane for opening the inhaler to a loading configuration and pivots to a horizontal position from a vertical plane to close the inhaler into a dosing configuration with a cartridge loaded into the inhaler.

The dry powder comprises an inhalable dry powder, including a pharmaceutical formulation comprising an active ingredient for pulmonary delivery. In some embodiments, delivery is to the deep lung (that is, to the alveolar region) and in some of these embodiments, the active agent or active ingredient is absorbed into the pulmonary circulation for systemic targeted or general use. The dry powder inhaler with a unit dose cartridge, and a drug delivery formulation comprising, for example, diketopiperazine and an active ingredient such as peptides and proteins, including, parathyroid hormone, insulin, oxyntomodulin and glucagon-like peptide 1. In some embodiments, the active ingredient comprises one or more of the active agents, which include, but are not limited to treprostinil, salmeterol, epinephrine, tacrolimus, vancomycin, linezolid, filgastrin, fentanyl, cannabinoids, palonosetron, amphotericin B, phosphodiesterase inhibitors, including, PDE5 inhibitors such as sildenafil, avanafil, verdenafil and tadalafil; prostaglandins, including prostacyclin (PG I2) and analogs thereof, neurotransmitter agonists, neurotransmitter antagonists, including anti-nociceptive agents, opioid analgesics such as delta opioid agonists and antagonists, kappa opioid receptor agonists and antagonists, mu opioid receptor agonist and antagonists.

In one embodiment, the dry powder inhaler comprises a housing, a moveable member, and a mouthpiece, wherein the moveable member is operably configured to move a container from a powder containment position to a dosing position. In this and other embodiments, the moveable member can be configured as part of a lid assembly at the proximal end of the inhaler and forms a portion of the cartridge mounting are. In this embodiment, the mouthpiece is integrally built with a lid or cover portion which covers the housing over the cartridge mounting area upon closing the inhaler. Movement of the mouthpiece in a downwardly direction from the horizontal plane, moves the lid or cover in an angular direction to a vertical position and opens the inhaler to give access to the interior of the inhaler to allow for loading and unloading a cartridge. Conversely, movement of the mouthpiece in an upwardly direction from a vertical plane to a horizontal plane induces closure of the inhaler and automatically generates an opening of an air pathway between the inhaler and a cartridge loaded onto the cartridge mounting area.

In another embodiment, the dry powder inhaler comprises a body, a housing, and a mouthpiece; the inhaler is structurally configured to have an open position, a closed position, and a mechanism operably configured to receive, hold, and reconfigure a cartridge from a containment position to a dispensing, dosing, or dose delivery position upon movement of said inhaler from the open position to the closed position. In versions of this embodiment, the mechanism can also reconfigure a cartridge installed in the inhaler from the dosing position to a containment position after use when the inhaler is opened to unload a used cartridge. In one embodiment, the mechanism can reconfigure a cartridge to a disposable or discarding configuration after use.

In one embodiment, the body of the inhaler comprises a proximal portion comprising the mouthpiece, a body and a distal portion comprising a housing which is structurally configured as a slip-on cover over portions of the body and internal parts of the inhaler; wherein the housing comprises a distal end and a proximal end and the proximal end has an opening for adapting and encapsulating a portion of the inhaler body. In one embodiment, the proximal end contacts or abuts the inhaler body so as to close the inhaler from the external environment. From the closed configuration, the inhaler is opened by movement of an upper portion of the housing in a distal direction over the body in a translational motion to attain an inhaler loading and/or unloading position to insert or remove a cartridge. With a cartridge installed in the inhaler, translational movement of the upper portion of the housing over the body in a distal to proximal direction causes cartridge displacement from a containment configuration to a dosing configuration, wherein the cartridge container is pushed to the dosing configuration by a projection configured in the interior of the housing that extends beyond the opening at the proximal end when the inhaler is in an open configuration. Movement of the top portion of the housing is effectuated by movement of a lever having a button-like structure at the top end and is attached to the housing and which opens and closes a cartridge mounting area of the inhaler. In the closed configuration, a cartridge installed in the inhaler is reconfigured to form an additional air passageway with the mouthpiece and ambient air to access a dry powder in cartridge in the dosing configuration upon inhalation. In this and other embodiments, the air passageway of a cartridge in a dosing configuration has an air inlet and an air outlet in communication with an air passageway in the mouthpiece, wherein the mouthpiece has its own air inlet and an air outlet.

In one embodiment, the body of the inhaler comprises a mouthpiece formed at a proximal end of the body and has an air conduit which is in communication with the interior of the housing and can be in direct communication with an air outlet of a cartridge installed in the inhaler and with ambient air. The inhaler body also comprises a cartridge mounting area which is continuous in structure with the mouthpiece and has a distal part and a proximal part; wherein the proximal part and the distal part form one single piece with the mouthpiece and is insertable in the housing. In one embodiment, the body and the housing can be pulled apart to attain an inhaler open configuration for access to an internal compartment. In an open configuration of this embodiment, a cartridge comprising a dry powder can be loaded or installed in a cartridge mounting area of the body, and the body and housing can be pushed or pulled to either open or close the inhaler. In one embodiment, the housing is moveable over the distal part of the body from an open to a closed configuration, and together they close the inhaler and effectuate the forming of an air conduit through a cartridge mounted in the cartridge mounting area. In this configuration, the inhaler attains a dosing configuration for a powder in the cartridge to be emitted from the inhaler upon an oral inhalation through the mouthpiece by a user. In this embodiment of the dosing configuration, the body and the housing abut one another and are adapted tightly together by one or more anti-slip structures to prevent the inhaler from coming apart. Examples of anti-slip features can include snap rings, or detents, which can generate a sound to alert a user that the inhaler is ready for use.

In one embodiment, the inhaler is substantially rectangular in shape with a distal side and a proximal side, and the distal side being shorter in length; wherein the inhaler comprises a movable housing portion which covers the distal portion of the inhaler body; movement of the housing over the body, or vice versa, is effectuated by separating the inhaler body from the housing to expose the interior of the inhaler; the movement of the housing can be a pulling or pushing action of the housing over inhaler body, which have parallel guide rails or tracks extending outwardly from the longer sides (a first side and a second side) of the inhaler in a longitudinal plane. In this embodiment, the inhaler body is designed to have an opening at its distal end to match the opening at the distal end of the housing to allow and guide ambient air into an interior chamber of the inhaler upon inhalation. The housing is also fittingly configured to have grooves or slots for gliding over the guide rails during opening and closing movements and also comprises stop ends to prevent disassembly of the inhaler, and a pushing element for positioning a cartridge in a dosing configuration after installation and closing of the inhaler when the housing is moved in a distal to proximal direction. The pushing element moves the cartridge cup or container relative to the cartridge lid to form an air passageway through the cartridge and create an air inlet and an air outlet and allow aerosolization of a powder in the cup during an inhalation for delivering the aerosolized particles to the inhaler mouthpiece and into a user. In another embodiment, the pushing element also moves the cartridge assembly to position the lid relative to the inlet opening located in the floor of the mouthpiece. In one aspect of this embodiment, the dry powder inhaler comprises a housing comprising a pushing element, wherein the housing positions the cartridge to align with the mouthpiece by translation of the housing over the inhaler body from an open configuration to a closed configuration.

In one embodiment, the dry powder inhaler comprises a housing having a distal end and configured with an opening for communicating with ambient air. In one embodiment, the housing is configured in the shape of a cover which slips over the inhaler body, to substantially envelop a portion of the body of the inhaler, the housing moves translationally over the distal part of the body; wherein the inhaler can attain two configurations, a first position which opens the inhaler to access its interior compartment, a chamber; and a second position which abuts the proximal end to attain closure of the inhaler. In one embodiment, the distal portion of the housing is also moveable with respect to the proximal end in a horizontal plane to extend distally and allow for access to the internal compartment of the inhaler and cover, surrounding the inhaler body. In versions of this embodiment, the distal portion of the housing comprises parallel structures or flanges for engaging portions of the body of the inhaler and forms a securing mechanism, for example, for locking the body of the inhaler with the housing to secure the two parts together and maintain the dosing configuration. In an embodiment, the distal portion of the housing has an opening at its distal end for communicating with the interior of the inhaler and an opening which is configured to slide over the inhaler body. The distal portion of the housing also comprises an external surface, an interior surface and a chamber configured to slide over the inhaler body. In one embodiment, the distal portion of the inhaler comprises parallel wing-like structure on its upper surface for directing airflow into the mouthpiece during an inhalation.

In an alternate embodiment, the mouthpiece is engaged to the body of the inhaler by various mechanisms including, a moveable member such as a hinge and is integrally configured with a moveable assembly, including a rack for moving a cartridge lid relative to cartridge cup or container. The moveable assembly is configured to receive and reconfigure a cartridge installed in the inhaler from a containment position to the dosing position and can be designed to operate manually or automatically upon movement of the inhaler components, for example, by closing the device from an open configuration. In one embodiment, the mechanism for reconfiguring a cartridge comprises a slide tray or sled attached to the mouthpiece and movably attached to the housing. In another embodiment, the mechanism is mounted or adapted to the inhaler and comprises a geared mechanism integrally mounted within, for example, a hinge of the inhaler device. In yet another embodiment, the mechanism operably configured to receive and reconfigure the cartridge from a containment position to a dosing position comprises a cam that can reconfigure the cartridge upon rotation of, for example, the housing or the mouthpiece. In one embodiment, angular rotation of the mouthpiece from the horizontal plane opens the inhaler to allow installation or removal of a cartridge and angular movement or the mouthpiece from a vertical plane to the horizontal plane effectuates closure of the mouthpiece and automatic reconfiguration of a cartridge from containment to dosing position. In an embodiment, the gear mechanism during actuation positions the cartridge lid relative to the inlet opening in mouthpiece and effectuates translation of the cup to a dosing configuration.

In yet another embodiment, a dry powder inhaler comprising a body and a mouthpiece is provided, wherein the inhaler body is designed to have a substantially rectangular-shaped body having a top, bottom, proximal and distal portions, and the top portion has an opening in the distal half of the inhaler body for allowing access to the interior compartment of the inhaler and to the cartridge mounting area. In this embodiment, the inhaler mouthpiece comprises two air inlets, one for communicating with ambient air at the distal end of the inhaler and one for communicating with the cartridge outlet port, and an air outlet at the proximal portion of the inhaler for inserting into a subject's mouth. In this embodiment, the body and mouthpiece are engaged together by a gear and rack and pinion assembly, wherein a moveable cartridge cup carrier is configured to be actuated by movement of the mouthpiece in a horizontal plane from about 180° angle parallel to the inhaler body to about a 90° angle or perpendicular to the inhaler body, which opens the inhaler to load and/or unload a cartridge. Movement of the mouthpiece back to 180° and parallel to the inhaler body closes the inhaler and automatically reconfigures a cartridge placed into the inhaler to a dosing configuration by displacing the cartridge cup to generate an air passageway between the inhaler mouthpiece and the cartridge, and further creating a cartridge inlet port for ambient air to transit the interior of the cartridge to aerosolize a powder in the cartridge upon an inhalation.

In another embodiment, a dry powder inhaler comprises a mouthpiece, a sled, slide tray, or a carriage, a housing, a hinge, and a gear mechanism configured to effectuate movement of the sled or slide tray; wherein the mouthpiece and the housing are moveably attached by the hinge.

Cartridges for use with the dry powder inhaler can be manufactured to contain any dry powder medicament for inhalation. In one embodiment, the cartridge is structurally configured to be adaptable to a particular dry powder inhaler and can be made of any size and shape, depending on the size and shape of the inhaler to be used with, for example, if the inhaler has a mechanism which allows for translational movement or for rotational movement. In one embodiment, the cartridge can be configured with a securing mechanism, for example, having a beveled edge on the cartridge top corresponding to a matching beveled edge in an inhaler so that the cartridge is secured in use. In one embodiment, the cartridge comprises a container and a lid or cover, wherein the container can be adapted to a surface of the lid and can be movable relative to the lid or the lid can be movable on the container and can attain various configurations depending on its position, for example, a containment configuration, a dosing configuration or after use configuration. During inhalation, a cartridge adapted to the inhaler in a dosing position allows airflow to enter the enclosure and mix with the powder to fluidize the medicament. The fluidized medicament moves within the enclosure such that medicament gradually exits the enclosure through the dispensing aperture, wherein the fluidized medicament exiting the dispensing aperture is sheared and diluted by a secondary flow not originating from within the enclosure. A cartridge for a dry powder inhaler is described, comprising: an enclosure configured to hold a medicament; at least one inlet port to allow flow into the enclosure, and at least one dispensing port to allow flow out of the enclosure; the at least one inlet port is configured to direct at least a portion of the flow entering the at least one inlet port at the at least one dispensing port within the enclosure in response to a pressure differential.

In some embodiments, the dry powder formulation is dispensed with consistency from the inhaler in less than about three (3) seconds, or generally less than one (1) second. In some embodiments, the inhaler air conduits are designed to yield high resistance to air flow values of, for example, approximately 0.065 to about 0.200 (√kPa)/liter per minute. Therefore, in the inhalation system, peak inhalation pressure drops of between 2 and 20 kPa produce resultant peak flow rates of about between 7 and 70 liters per minute. These flow rates result in greater than 75% of the cartridge contents dispensed in fill masses between 1 and 50 mg. In some embodiments, these performance characteristics are achieved by end users within a single inhalation maneuver to produce cartridge dispense percentage of greater than 90%. In certain embodiments, the inhaler and cartridge system are configured to provide a single dose by discharging powder from the inhaler as a continuous flow, or as one or more pulses of powder delivered to a patient.

In another embodiment, the inhalation system comprises a breath-powered dry powder inhaler, a cartridge containing a dry powder, for delivering to the pulmonary tract and lungs, including a medicament, wherein the medicament can comprise, for example, a drug formulation for pulmonary delivery such as a composition comprising a diketopiperazine in a crystalline form that self-assembles, an amorphous form, and/or a microcrystalline form comprising crystallites that do not self-assemble, or combinations thereof, and an active agent. In alternate embodiments, the dry powder may be formulated of other carriers and/or excipients other than diketopiperazines, for example a sugar, including trehalose, and an active agent. In some embodiments, the active agent comprises peptides and proteins, such as insulin, glucagon-like peptide 1, oxyntomodulin, peptide YY, exendin, or any of the aforementioned active ingredients, analogs thereof, and the like. The inhalation system can be used, for example, in methods for treating conditions requiring localized or systemic delivery of a medicament, for example, in methods for treating diabetes, pre-diabetes conditions, allergy, infections, including septicemia, urinary and respiratory tract infection, anaphylaxis, pulmonary disease, renal, liver, cognitive, neurodegenerative or cardiovascular disease, blood disorders, cancer and obesity, and symptoms associated with these disease. In one embodiment, the inhalation system comprises a kit, including at least one of each of the components of the inhalation system for treating the disease or disorder.

DETAILED DESCRIPTION

Figure 1:
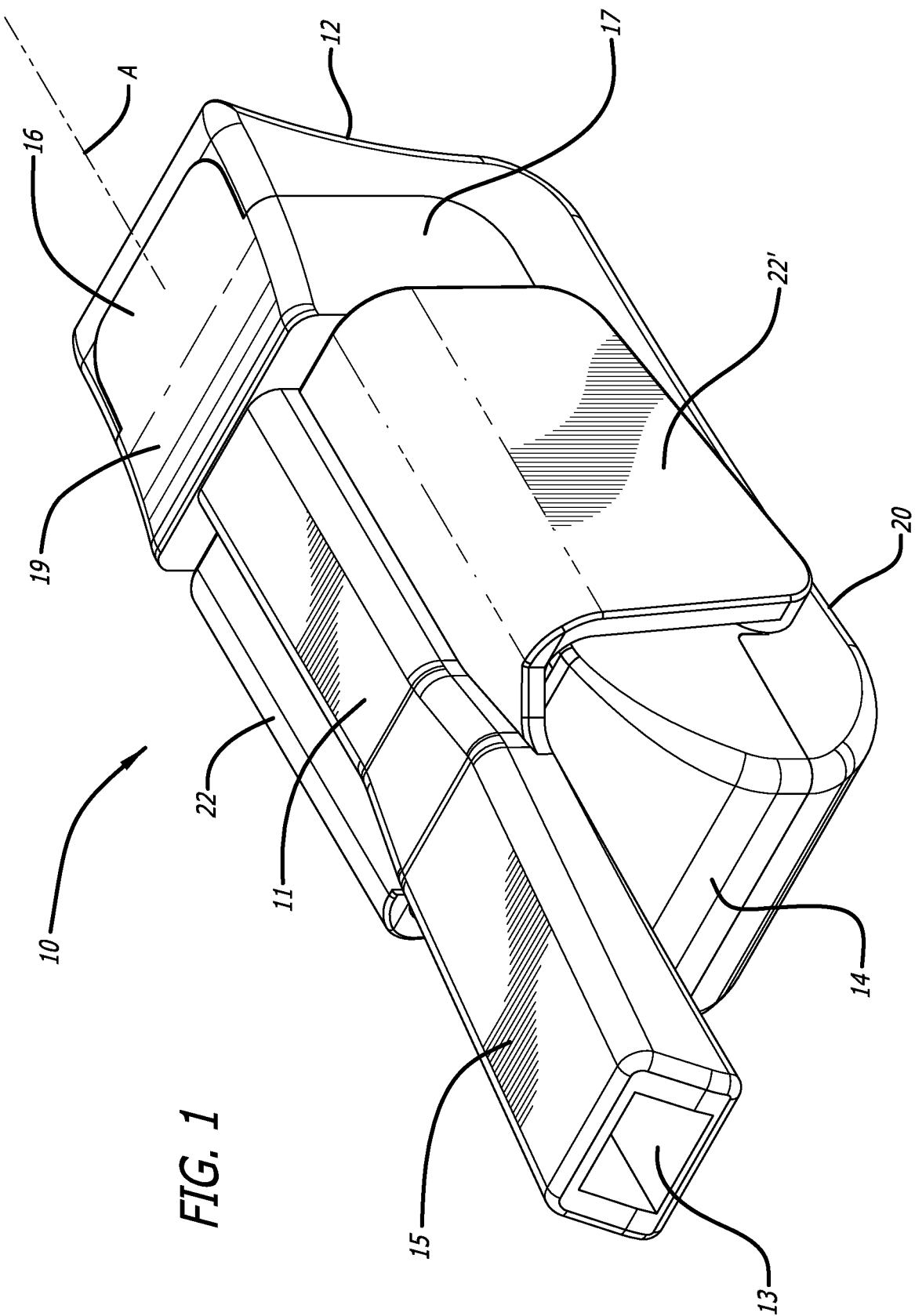
FIG. 1 depicts a perspective view of an embodiment of a dry powder inhaler in a closed position, ready to use configuration.

In embodiments disclosed herein, dry powder inhalers comprising a cartridge for delivering dry powders including pharmaceutical medicaments to a subject by oral inhalation are described. In one embodiment, the dry powder inhaler is a breath-powered, dry powder inhaler, and the cartridge is designed to contain an inhalable dry powder, including but not limited to pharmaceutical formulations comprising an active ingredient, including a pharmaceutically active substance and optionally a pharmaceutically acceptable carrier.

The dry powder inhalers are provided in various embodiments of shapes and sizes, and can be reusable, easy to use, inexpensive to manufacture and/or produced in high volumes in simple steps using plastics or other acceptable materials. Various embodiments of the dry powder inhalers are provided herein and in general, the inhalation systems comprise inhalers, powder-filled cartridges, and empty cartridges. The present inhalation systems can be designed to be used with any type of dry powder. In one embodiment, the dry powder is a relatively cohesive powder which requires optimal deagglomeration conditions. In one embodiment, the inhalation system provides a re-useable, miniature breath-powered inhaler in combination with single-use cartridges containing pre-metered doses of a dry powder formulation.

As used herein the term "a unit dose inhaler" refers to an inhaler that is adapted to receive a single cartridge or container comprising a dry powder formulation and delivers a single dose of a dry powder formulation by inhalation from a single container to a user. It should be understood that in some instances multiple unit doses will be required to provide a user with a specified dosage.

As used herein a "cartridge" is an enclosure configured to hold or contain a dry powder formulation, a powder containing enclosure, which has a cup or container and a lid. The cartridge is made of rigid materials, and the cup or container is moveable relative to the lid in a translational motion or vice versa.

As used herein a "powder mass" is referred to an agglomeration of powder particles or agglomerate having irregular geometries such as width, diameter, and length.

As used herein a "unit dose" refers to a pre-metered dry powder formulation for inhalation. Alternatively, a unit dose can be a single container having multiple doses of formulation that can be delivered by inhalation as metered single amounts. A unit dose cartridge/container contains a single dose. Alternatively it can comprise multiple individually accessible compartments, each containing a unit dose.

As used herein, the term "about" is used to indicate that a value includes the standard deviation of error for the device or method being employed to determine the value.

As used herein, the term "microparticle" refers to a particle with a diameter of about 0.5 to about 1000 irrespective of the precise exterior or interior structure. Microparticles having a diameter of between about 0.5 and about 10 microns can reach the lungs, successfully passing most of the natural barriers. A diameter of less than about 10 microns is required to navigate the turn of the throat and a diameter of about 0.5 µm or greater is required to avoid being exhaled. To reach the deep lung (or alveolar region) where most efficient absorption is believed to occur, it is preferred to maximize the proportion of particles contained in the "respirable fraction" (RF), generally accepted to be those particles with an aerodynamic diameter of about 0.5 to about 6 though some references use somewhat different ranges, as measured using standard techniques, for example, with an Anderson Cascade Impactor. Other impactors can be used to measure aerodynamic particle size such as the NEXT GENERATION IMPACTOR™ (NGI™ MSP Corporation), for which the respirable fraction is defined by similar aerodynamic size, for example <6.4 In some embodiments, a laser diffraction apparatus is used to determine particle size, for example, the laser diffraction apparatus disclosed in U.S. Pat. No. 8,508,732, which disclosure is incorporated herein in its entirety for its relevant teachings related to laser diffraction, wherein the volumetric median geometric diameter (VMGD) of the particles is measured to assess performance of the inhalation system. For example, in various embodiments cartridge emptying of ≥80%, 85%, or 90% and a VMGD of the emitted particles of <12.5 µm, <7.0 µm, or <4.8 µm can indicate progressively better aerodynamic performance.

Respirable fraction on fill (RF/fill) represents the percentage (%) of powder in a dose that is emitted from an inhaler upon discharge of the powder content filled for use as the dose, and that is suitable for respiration, i.e., the percent of particles from the filled dose that are emitted with sizes suitable for pulmonary delivery, which is a measure of microparticle aerodynamic performance. As described herein, a RF/fill value of 40% or greater than 40% reflects acceptable aerodynamic performance characteristics. In certain embodiments disclosed herein, the respirable fraction on fill can be greater than 50%. In an exemplary embodiment, a respirable fraction on fill can be up to about 80%, wherein about 80% of the fill is emitted with particle sizes <5.8 μm as measured using standard techniques.

As used herein, the term "dry powder" refers to a fine particulate composition that is not suspended or dissolved in a propellant, or other liquid. It is not meant to necessarily imply a complete absence of all water molecules.

As used herein, "amorphous powder" refers to dry powders lacking a definite repeating form, shape, or structure, including all non-crystalline powders.

In exemplary embodiments herewith, the present devices can be manufactured by several methods and from various materials. In one embodiment, the inhalers and cartridges are made, for example, by injection molding techniques, thermoforming, blow molding, pressing, 3D printing, and the like using various types of plastic materials, including, polypropylene, cyclicolephin co-polymer, nylon, and other compatible polymers and the like. In certain embodiments, the dry powder inhaler can be assembled using top-down assembly of individual component parts. In some embodiments, the inhalers are generally provided in compact sizes, for example, from about 1 inch to about 5 inches in dimension, and generally, the width and height are less than the length of the device. In certain embodiments the inhaler is provided in various shapes including, relatively rectangular bodies, although other shapes can be used such as cylindrical, oval, tubular, squares, oblongs, and circular forms.

In embodiments described and exemplified herewith, the inhalers effectively fluidize, deagglomerate or aerosolize a dry powder formulation by using at least one relatively rigid flow conduit pathway for allowing an airflow to enter the inhaler. For example, the inhaler is provided with a first air flow pathway for entering and exiting a cartridge containing the dry powder, and a second air pathway which can merge with the first air flow pathway exiting the cartridge. The flow conduits, for example, can have various shapes and sizes depending on the inhaler configuration. In one embodiment, the inhaler are high resistance inhalers resistance value of, for example, approximately 0.065 to about 0.200 (√kPa)/liter per minute. Therefore, in the system, peak inhalation pressure drops of between 2 and 20 kPa produce resultant peak flow rates of about between 7 and 70 liters per minute. These flow rates result in greater than 75% of the cartridge contents dispensed in fill masses between 1 and 50 mg. In some embodiments, these performance characteristics are achieved by end users within a single inhalation maneuver to produce cartridge dispense percentage of greater than 90% of the powder contained in a cartridge.

An embodiment of dry powder inhaler 10 is exemplified in FIGS. 1-5. Inhaler 10 comprises two elements, body 12 and mouthpiece cover 11. In this embodiment, dry powder inhaler 10 is relatively rectangular, with longer sides extending in the longitudinal plane and is designed to attain two configurations, i.e., a first configuration, which is a closed or dosing configuration as illustrated in FIGS. 1, 3 and 4, and a second configuration or open or cartridge loading/unloading configuration as illustrated in FIGS. 2 and 5. As depicted in FIGS. 1-5, dry powder inhaler 10 has a relatively rectangular body 12 which is manufactured as a single element and has a proximal end 14 which is substantially C-shaped comprising a mouthpiece 15 for contacting the user's lips or oral cavity, and a distal end 16, with a right side 17, left side 18, top side 19 and bottom side 20. Mouthpiece 15 has an outlet 13 and a first inlet 21 for allowing bypass air to flow through an air conduit 5 external to the interior of the inhaler body 12 but in communication with the chamber or interior of the inhaler body through a second inlet 3 located in the bottom portion of the mouthpiece in contact with inhaler body 12. The second inlet specifically is for contacting outlet port or dispensing port 31 of a cartridge installed in the cartridge mounting area. FIG. 3 depicts mouthpiece 15 is narrower in shape at its distal end and tapers outwardly towards the proximal end and is configured with an air conduit 5 which is similar to its exterior shape. Mouthpiece 15 is designed as a single element having a saddle-like or wing-like structures 22, 22' extending partially outwardly to the junction between top side 19 and downwardly over the right side 17 and left side 18 forming a portion of the top side 19 and covering or resting over right side 17 and left side 18 of the inhaler body 12 for closing inhaler 10 as mouthpiece cover 11. To prevent movement of mouthpiece cover 10 during use, locking mechanisms can be provided, including snap fits, detents such as detent 25 for adapting to element 26.

Figure 2:
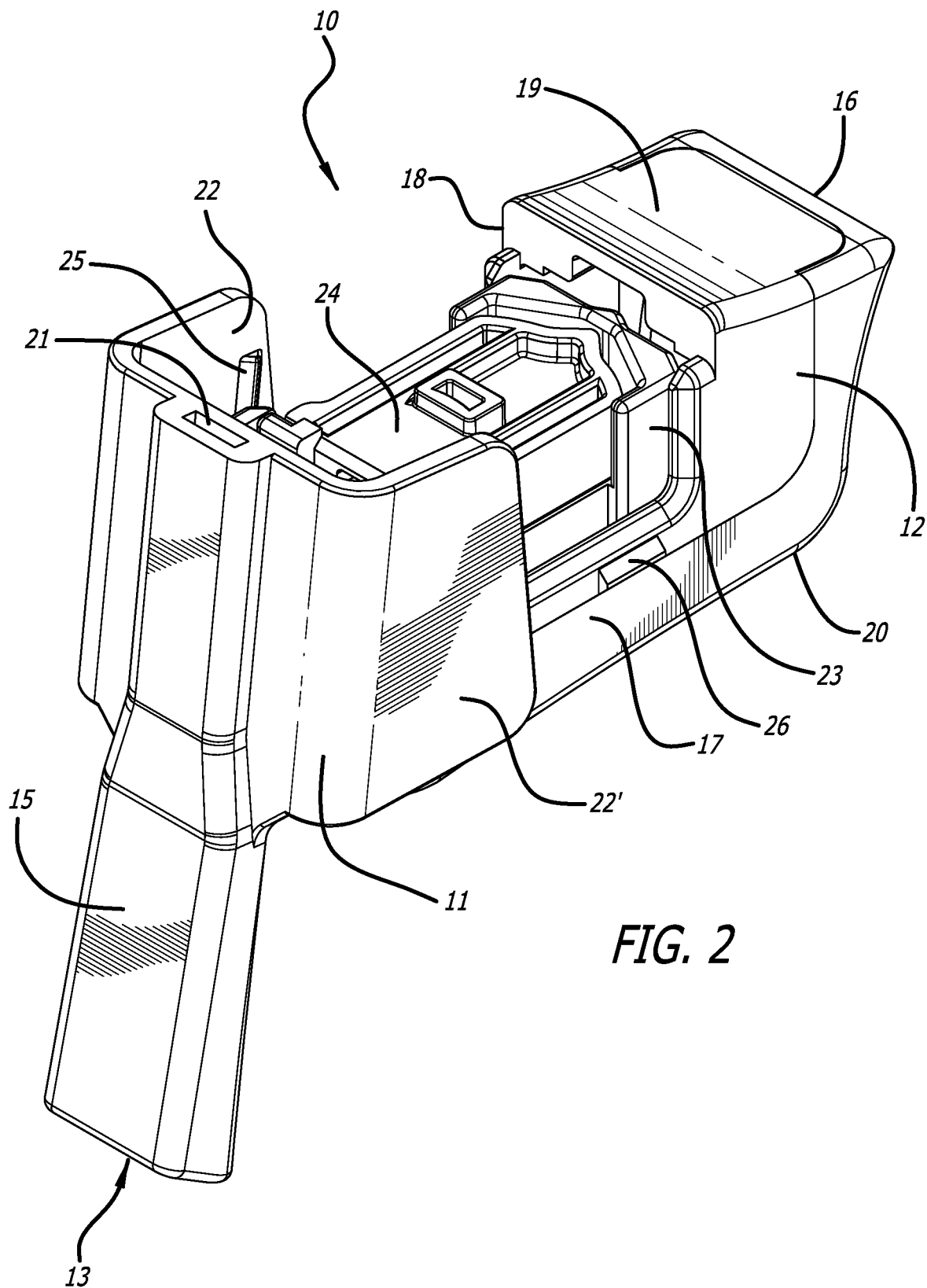
FIG. 2 depicts a perspective view of the dry powder inhaler of FIG. 1 showing the dry powder inhaler in a fully open, cartridge loading/unloading position and having a cartridge installed in the cartridge mounting area, wherein the cartridge is in a powder containment configuration.
Figure 5:
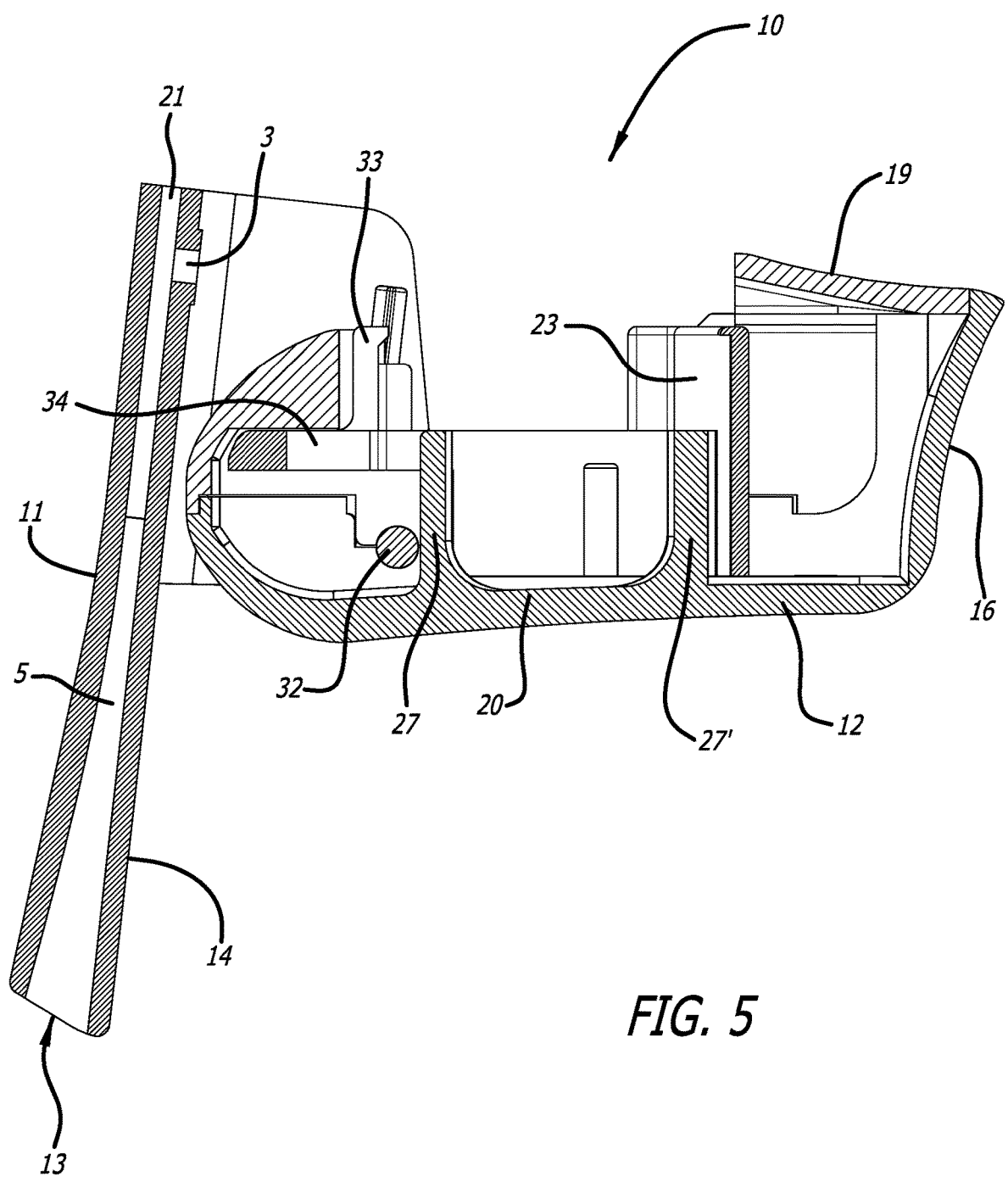
FIG. 5 depicts a cross-sectional view through the mid-longitudinal axis of the inhaler in FIG. 1, similarly to FIG. 4, but without a cartridge and in an open configuration.
Figure 6:
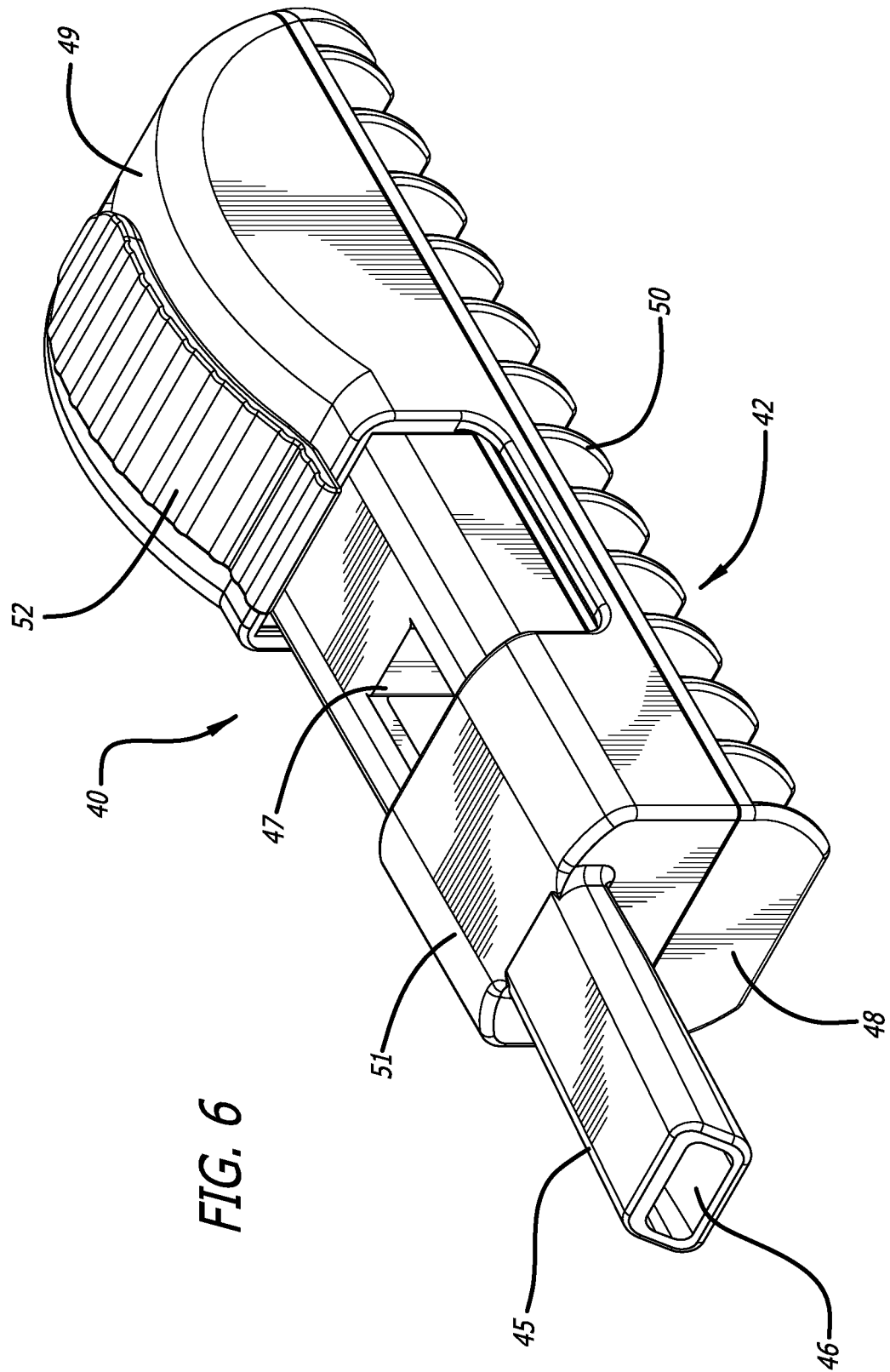
FIG. 6 depicts a perspective view of an alternate dry powder inhaler embodiment shown in a closed position.

FIGS. 2 and 5 illustrate inhaler 10 in an open configuration showing the interior of body 12. FIG. 5 depicts inhaler 10 in an open configuration and FIG. 2 represents inhaler 10 with a cartridge 24 installed in the cartridge mounting assembly 23. To attain an open configuration, mouthpiece 11 is pushed downwardly from its mouthpiece 15, and grasping the distal top portion of inhaler 12, which actuates the entire element 11 to rotate angularly to about a 90° to lie perpendicularly with body 12. Movement of the mouthpiece cover 11 is effectuated by providing the inhaler with a hinge, for example, a rack and pinion comprising an axle 32 connected to a gear having a rack, which is engaged to a rack on a moveable cartridge mounting area 23.

Figure 3:
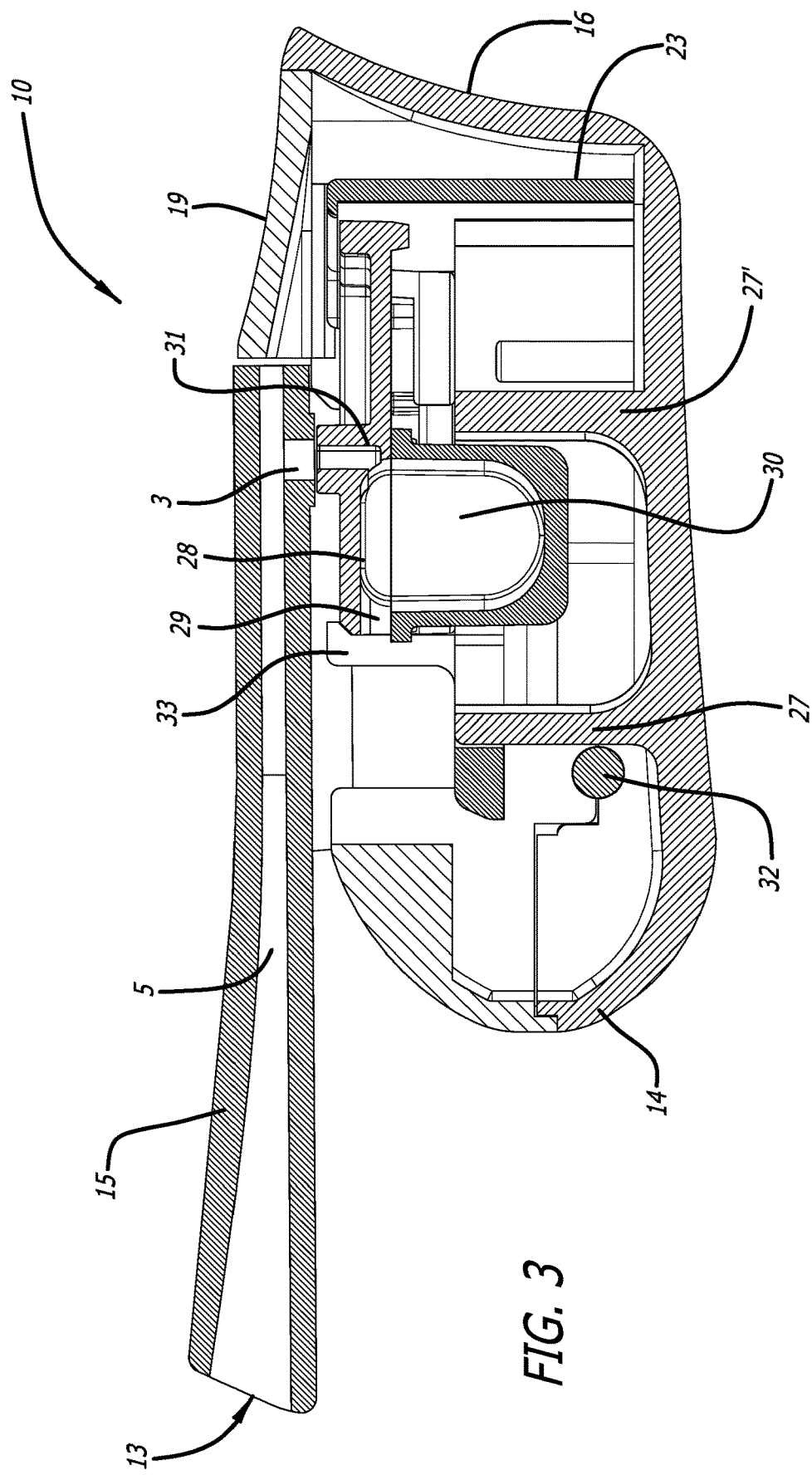
FIG. 3 depicts a cross-sectional view through the mid-longitudinal axis of the dry powder inhaler of FIG. 1 showing the inhaler containing a cartridge installed in the inhaler and in a powder dosing configuration showing the airflow pathway formed through the cartridge chamber.
Figure 4:
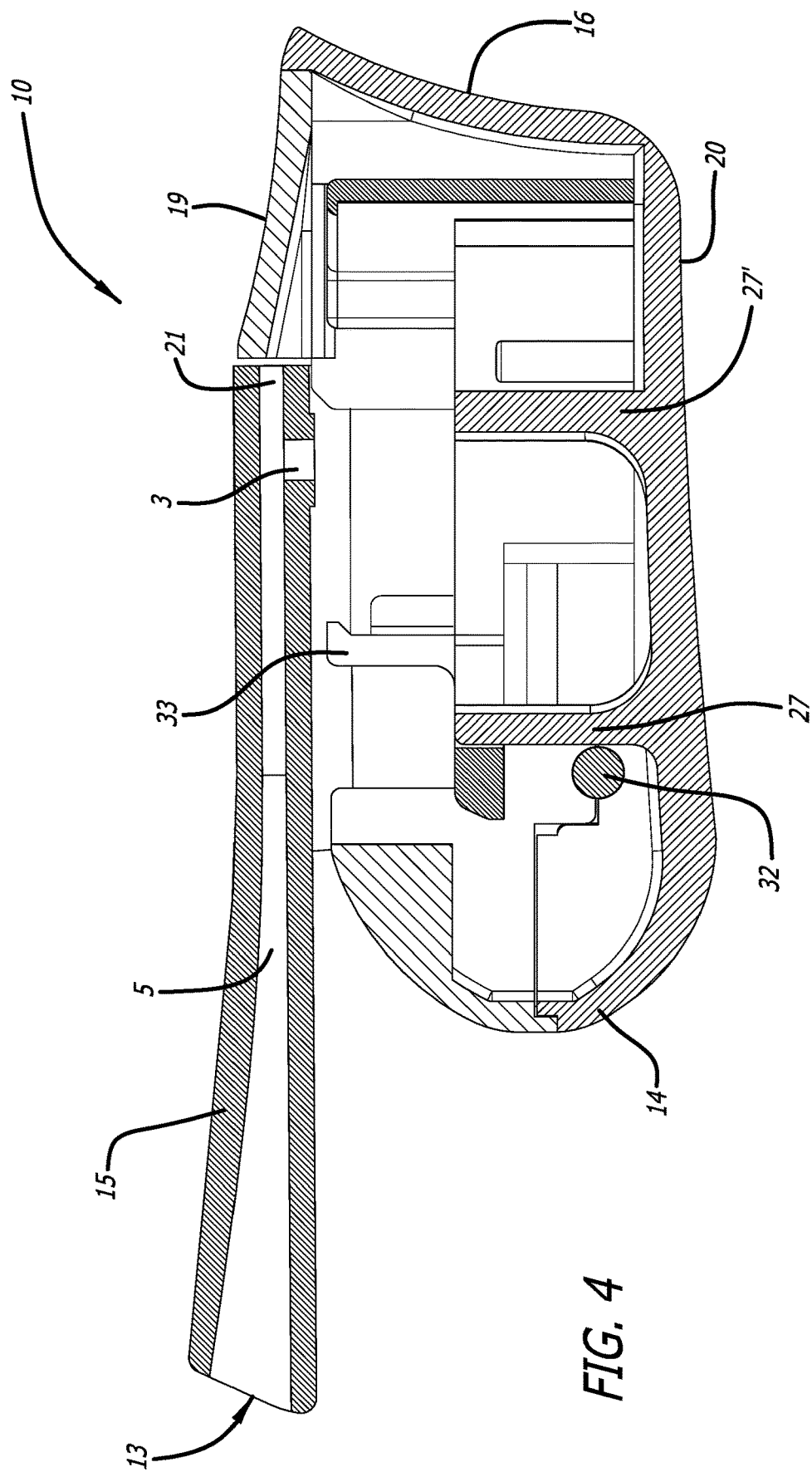
FIG. 4 depicts a cross-sectional view through the mid-longitudinal axis of the inhaler in FIG. 1, similarly to FIG. 3, but without a cartridge.

FIG. 3 is a mid-longitudinal section of inhaler 10 with a cartridge mounted in a dosing position and illustrates the pushing element 33 of moveable cartridge mounting area 23 fully positioning the cartridge in the dosing configuration, wherein an air passageway is created having air inlet 29 and air outlet 31 to access the interior of the cartridge cup 30. In this embodiment, upward movement of mouthpiece cover 11, while holding mouthpiece 15 to a horizontal plane, closes the inhaler as shown in FIG. 1 and while moving, portions of the movable portion of the cartridge assembly in the cartridge mounting area 23 are pushed distally by a moveable element in the proximal portion of the cartridge mounting area, resulting in distal movement of the cartridge lid 28 over the cartridge cup 30, which cup 30 is retained at the mounting area by rigid projections 27, 27' from the interior surface from the bottom side 20 of body 12. After use, by opening inhaler 10, the cartridge is returned to a discarding/unloading position and the cycle can be repeated with a new dose. FIG. 4 depicts a mid-longitudinal section of the inhaler in FIG. 1 in the closed configuration without a cartridge illustrating the relationship of the interior of the device.

FIG. 5 depicts inhaler 10 in an open configuration without a cartridge through the mid-longitudinal section of the inhaler of FIG. 1. Illustrating the cartridge mounting area with its rigid projection protruding from the interior bottom surface 20 of inhaler body 12, cartridge lid pushing element 33 of moveable cartridge mounting area 23 for translating a lid over a cup of a cartridge to attain a dosing configuration upon movement of the mouthpiece cover 11 to the closed position.

Figure 7:
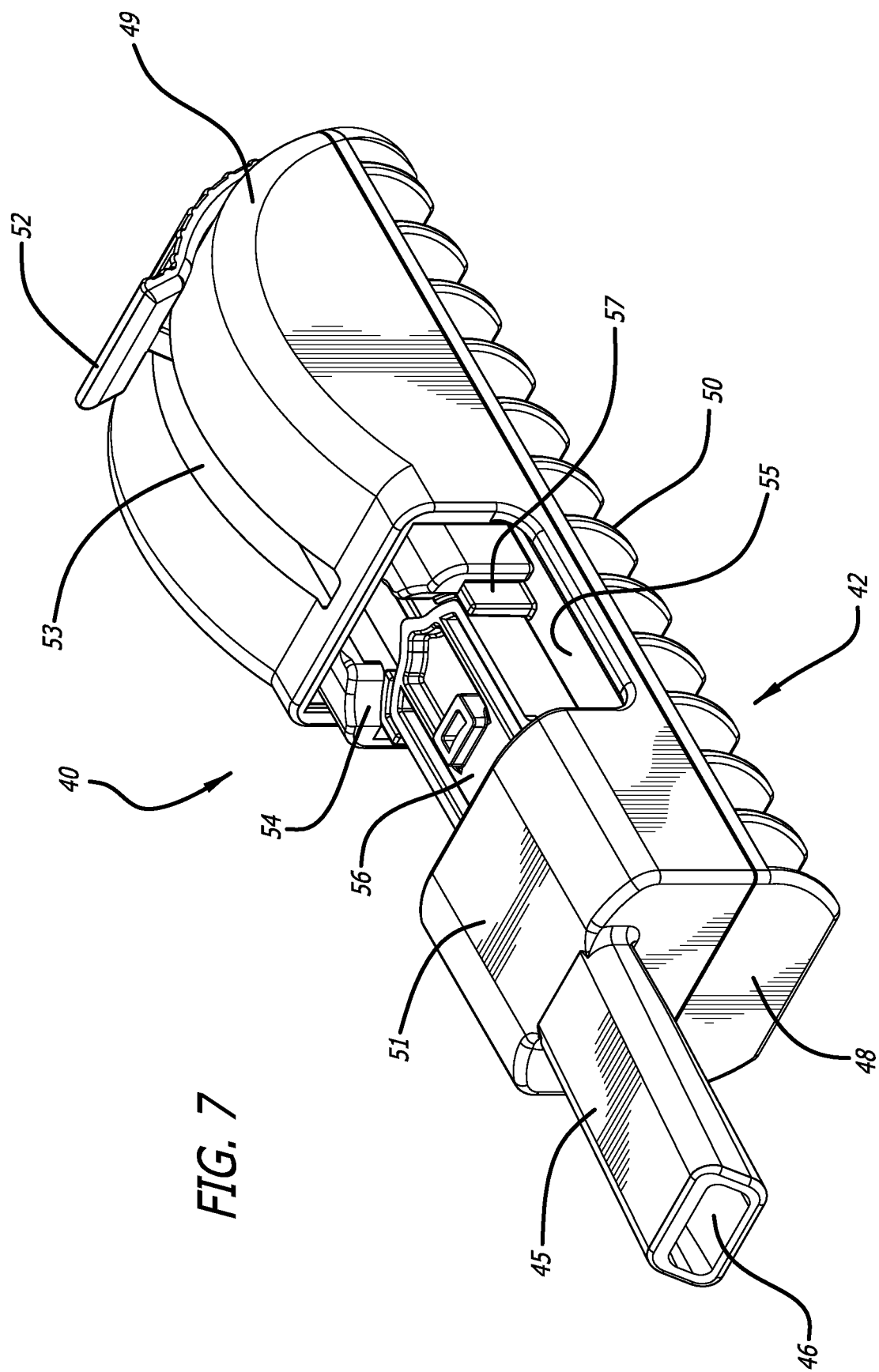
FIG. 7 depicts a perspective view of the dry powder inhaler of FIG. 6 in an open, cartridge loading/unloading position and having a cartridge installed in the cartridge mounting area, wherein the cartridge is in a powder containment configuration.
Figure 8:
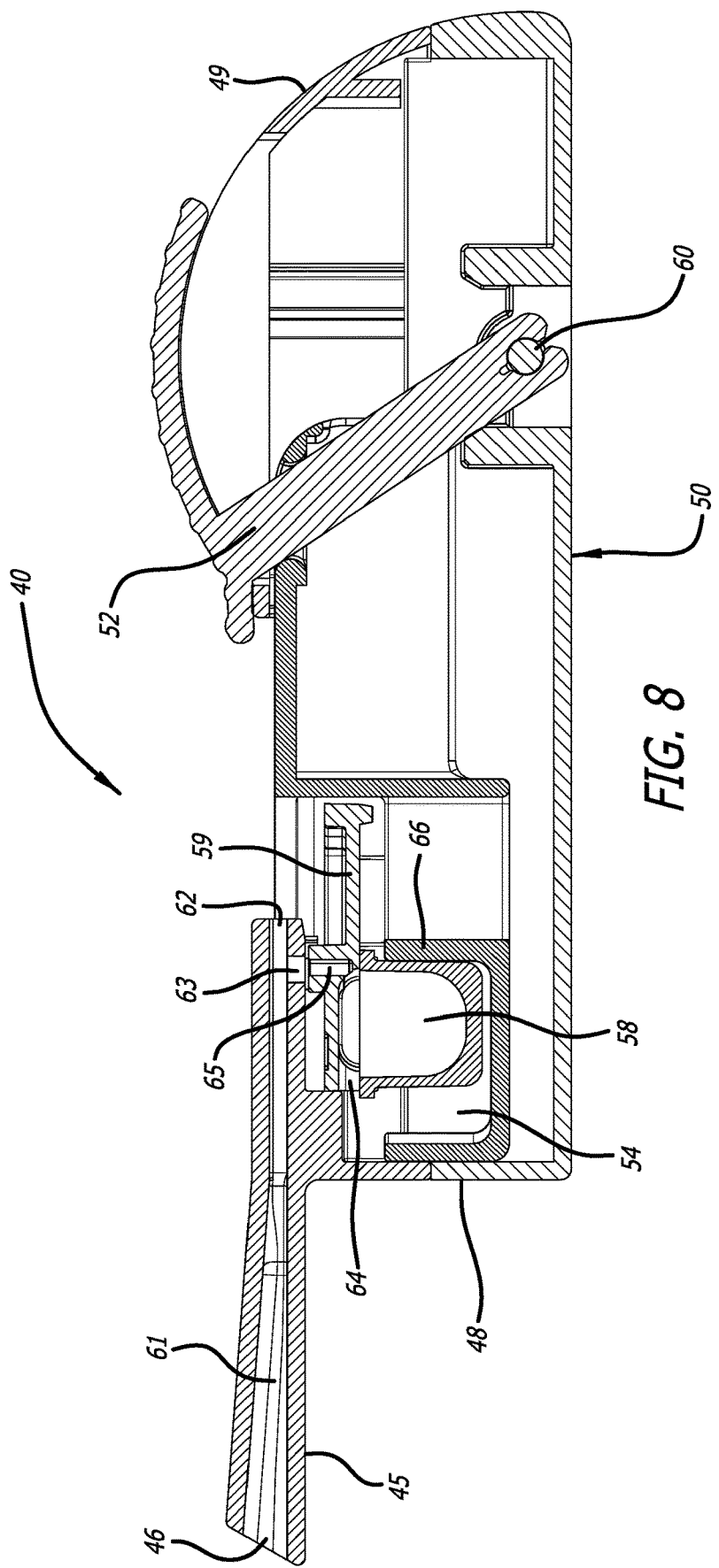
FIG. 8 depicts a cross-sectional view through the mid-longitudinal axis of the dry powder inhaler of FIG. 6 showing the closed inhaler containing a cartridge in a powder dosing configuration showing the inhaler airflow pathway formed through the cartridge chamber.

FIGS. 6-10 illustrate an alternate embodiment, wherein dry powder inhaler 40 comprises body 42, mouthpiece 45 having at least two air inlets and one outlet 46, and a cartridge mounting and reconfiguring mechanism 47. Inhaler 40 also comprises a discontinuous top side 51, a proximal end 48, a distal end 49, and a bottom portion 42 which can be configured with segmental rib-like structures 50. In this embodiment, inhaler 40 is in the closed position. The distal half of top portion 49 of inhaler body 42 has an opening or slot 53 in the mid-longitudinal plane for accommodating moveable lever 52, for engaging with a moveable rack 54 in the interior compartment of inhaler body 42 to effectuate movement of the cartridge mounting and reconfiguring mechanism 47, which comprises a rack with pushing elements for translating the lid of a cartridge over a cup or translating a cup under a secured lid of a cartridge. In this embodiment, upon manual actuation of lever 52 distally, the inhaler is configured in the cartridge loading position. FIG. 7 depicts inhaler 40 in an open configuration with a cartridge installed or mounted in the cartridge mounting area 55. In preparing a dose for pulmonary inhalation, a user can place or install a cartridge 56 in the inhaler as shown in FIG. 7. After cartridge 56 is installed or loaded into cartridge mounting area 55, lever 52 is moved proximally until it cannot move anymore. FIG. 8 depicts a mid-longitudinal section through inhaler 40 in a closed or dosing configuration with a cartridge mounted in the cartridge mounting and reconfiguring area 55 depicting pushing element 66 displacing cup 58 under lid 59 in the dosing configuration. While lever 52 is in motion, pushing elements 66 on the interior of the inhaler engaged to lever 52 actuate the pushing elements 66 of the rack to move cartridge 56 and reconfigure its lid to create an air conduit with an air inlet 64, and an air outlet 65 which is in communication with the second inlet 63 of mouthpiece 45 for delivering a powder to the mouthpiece air conduit 61, and outlet 46 during an inhalation. Air intake through first inlet 62 bypasses the cartridge compartment upon inhalation. The discontinuous area on inhaler top side 51 allows access to cartridge mounting area 55. FIG. 8 also shows lever 52 engaged to the axle 60 of reconfiguring mechanism 47.

Figure 9:
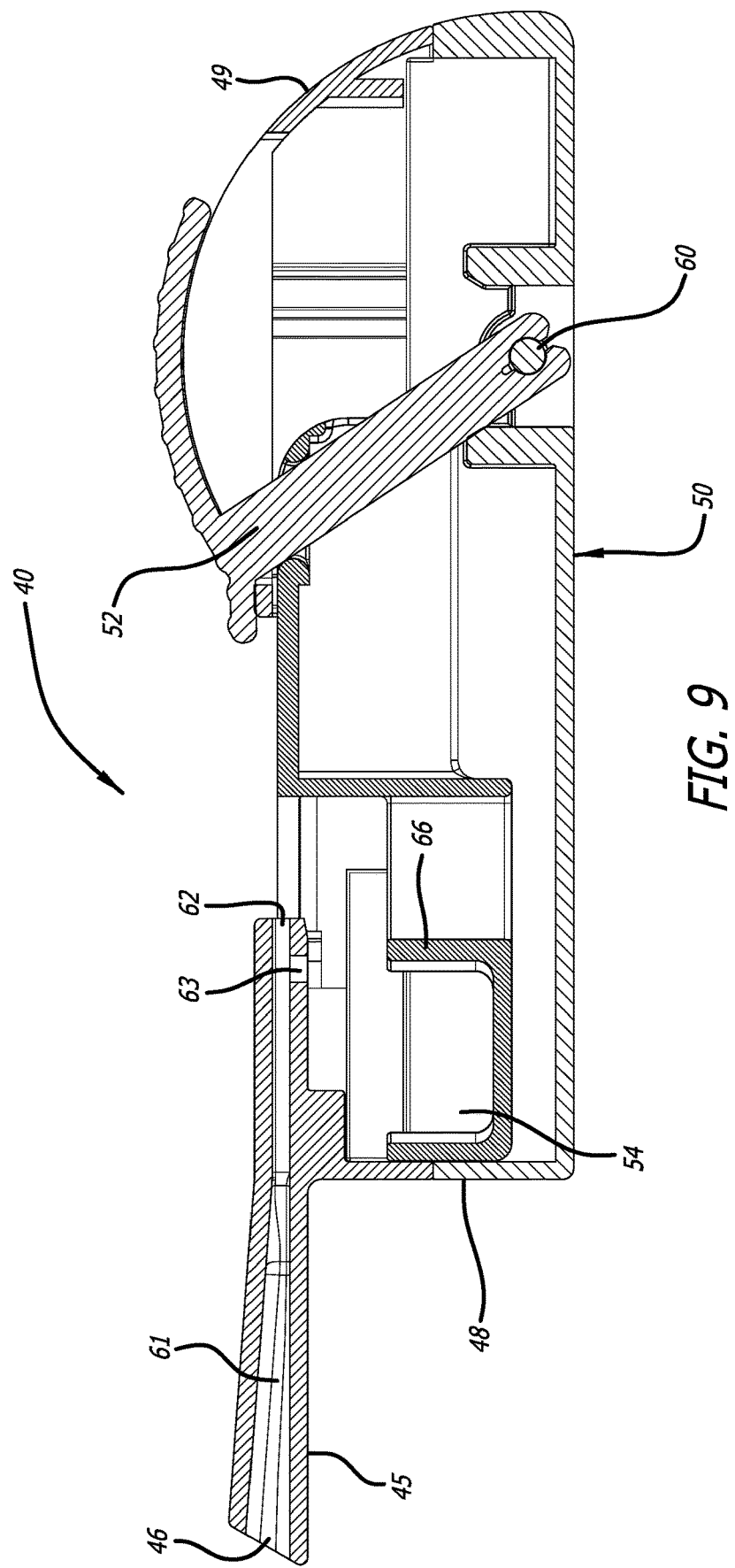
FIG. 9 depicts a cross-sectional view through the mid-longitudinal axis of the inhaler in FIG. 6, similarly to FIG. 8, but without a cartridge.
Figure 10:
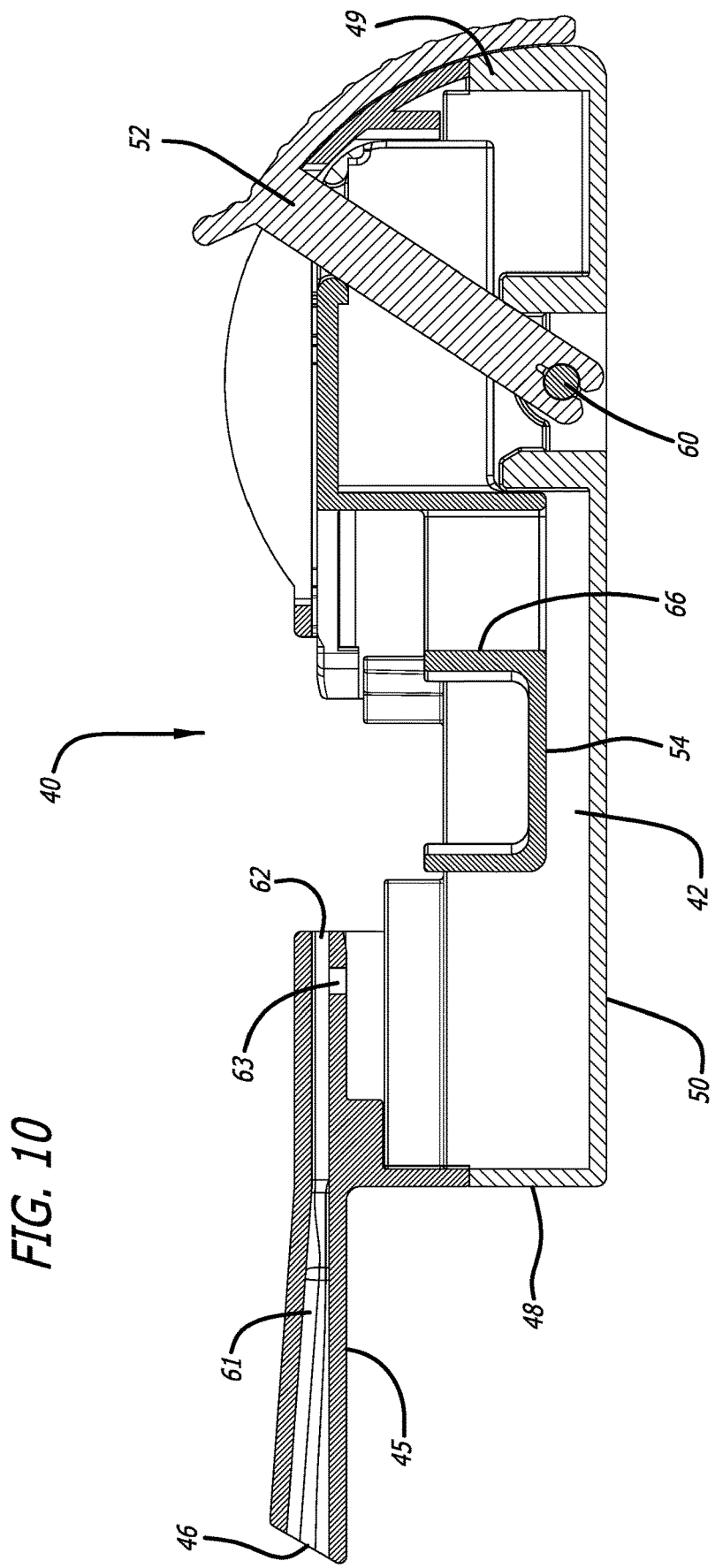
FIG. 10 depicts a cross-sectional view through the mid-longitudinal axis of the inhaler in FIG. 6, similarly to FIG. 9, but without a cartridge and in an open configuration.

FIG. 9 illustrates inhaler 40 closed, similarly to FIG. 8, except without a cartridge and positioned at the proximal end of inhaler body 42. In this configuration, FIG. 9 depicts the relationships of rack 54 comprising pushing elements 66 and the closed proximity of horizontal first inlet 62 forming almost a right angle with second inlet 63 of mouthpiece 45 for effectuating powder deagglomeration by shearing forces during an inhalation of a powder dose. FIG. 10 illustrates inhaler 40 as depicted in FIG. 9 without a cartridge in an open configuration through a mid-longitudinal section, showing the position of lever 52 and the rack 54 for holding a cartridge and position in the center portion of inhaler body 42 end of the inhaler interior. FIG. 10 also shows rack 54 integrally engaged to the moveable mechanism as depicted by axle 60 in contact with lever 52 for mechanically pushing rack 54.

Figure 11:
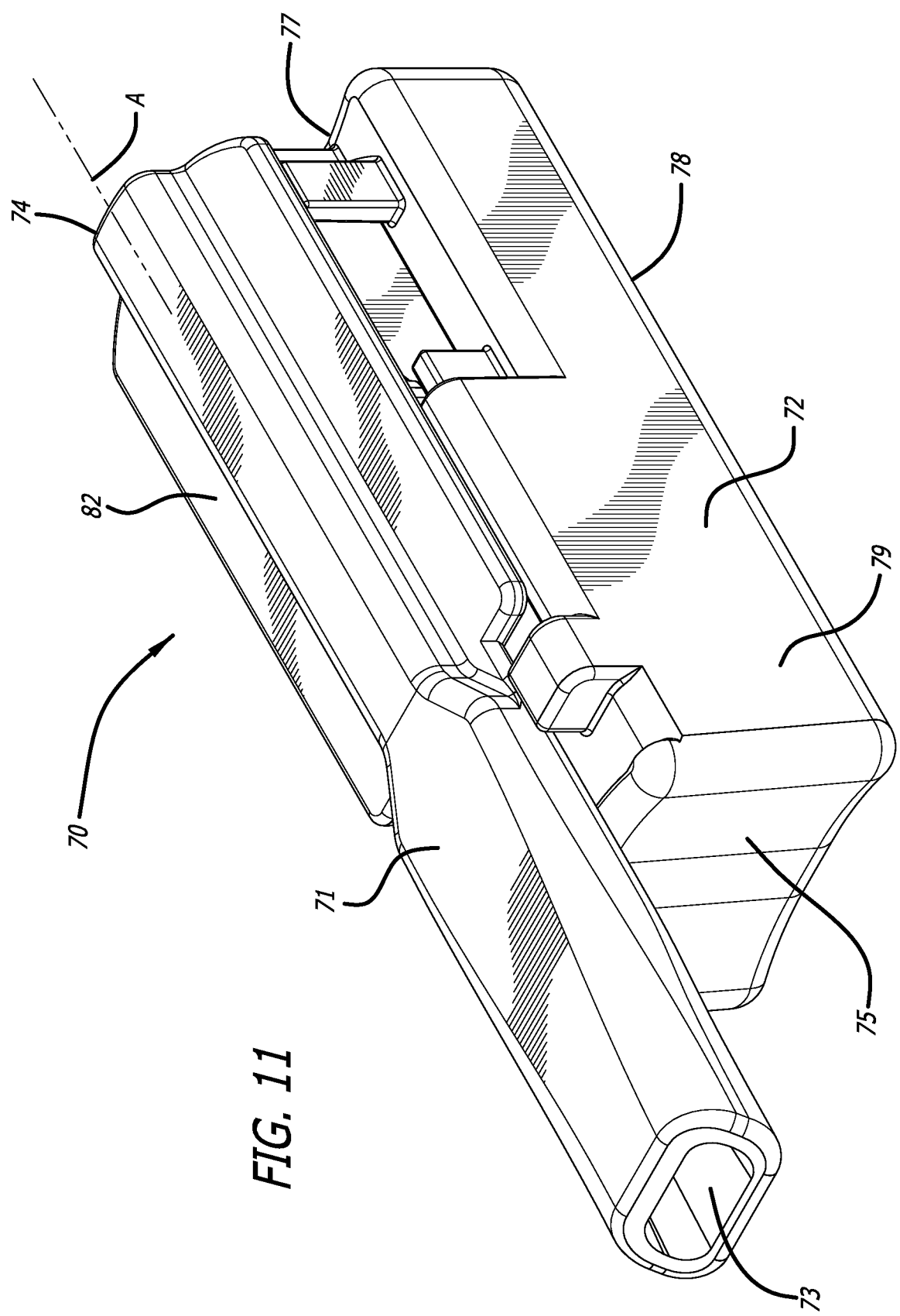
FIG. 11 depicts a perspective view of yet another alternate embodiment of a dry powder inhaler in the closed or inhalation position.
Figure 12:
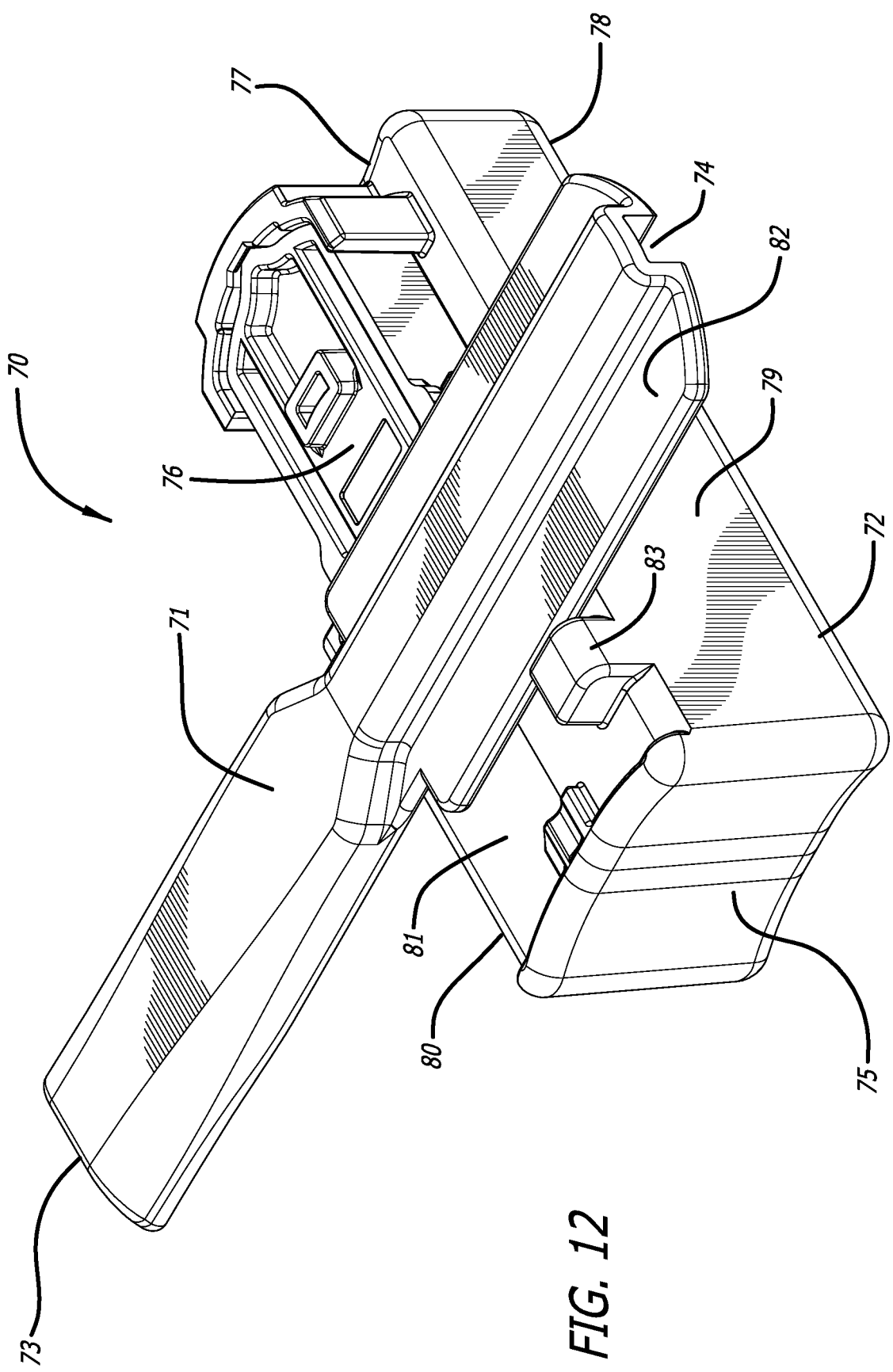
FIG. 12 depicts the dry powder inhaler of FIG. 11 in an open, cartridge loading/unloading position and having a cartridge installed in the cartridge mounting area, wherein the cartridge is in a powder containment configuration.
Figure 13:
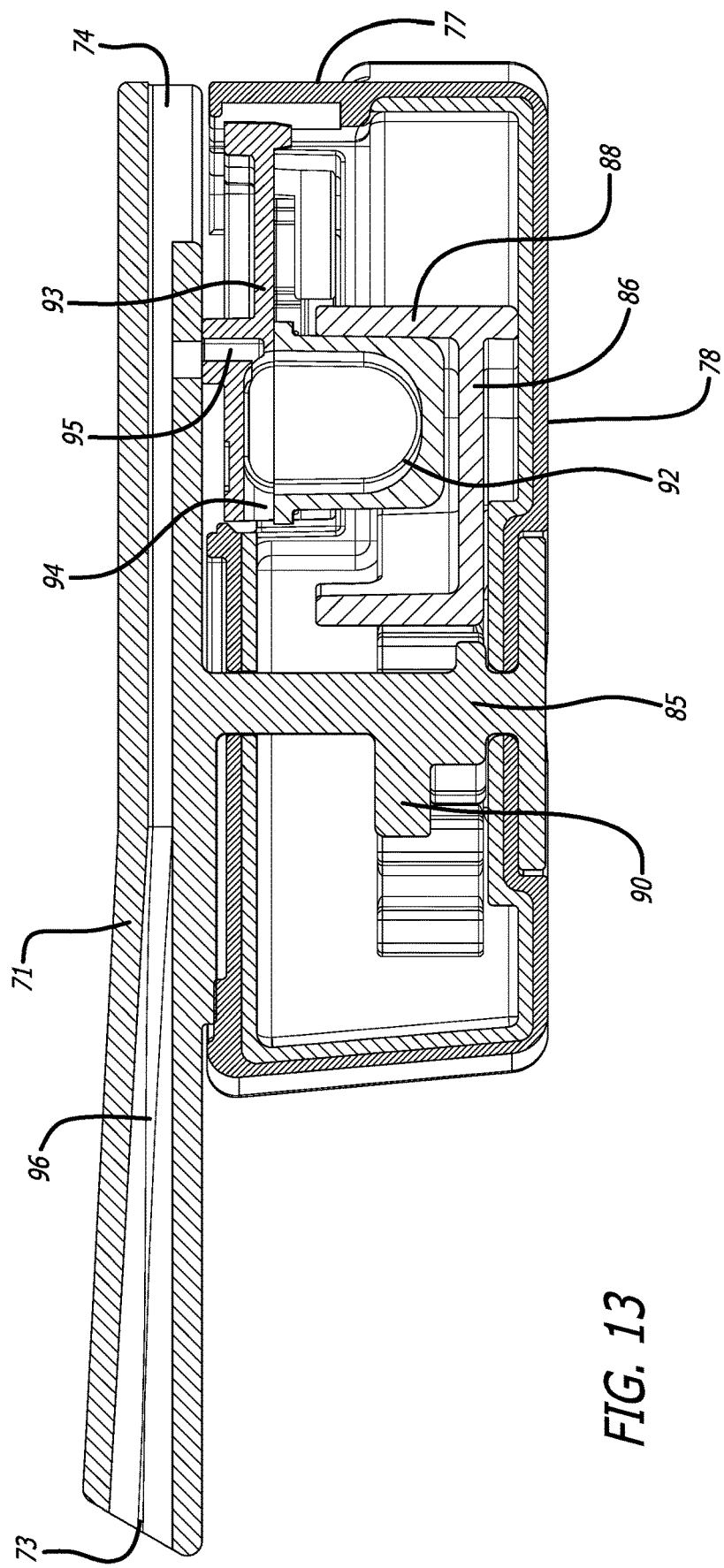
FIG. 13 depicts a cross-sectional view through the mid-longitudinal axis of the dry powder inhaler of FIG. 11, showing the closed inhaler containing a cartridge in a powder dosing configuration showing the inhaler airflow pathway formed through the cartridge chamber.
Figure 14:
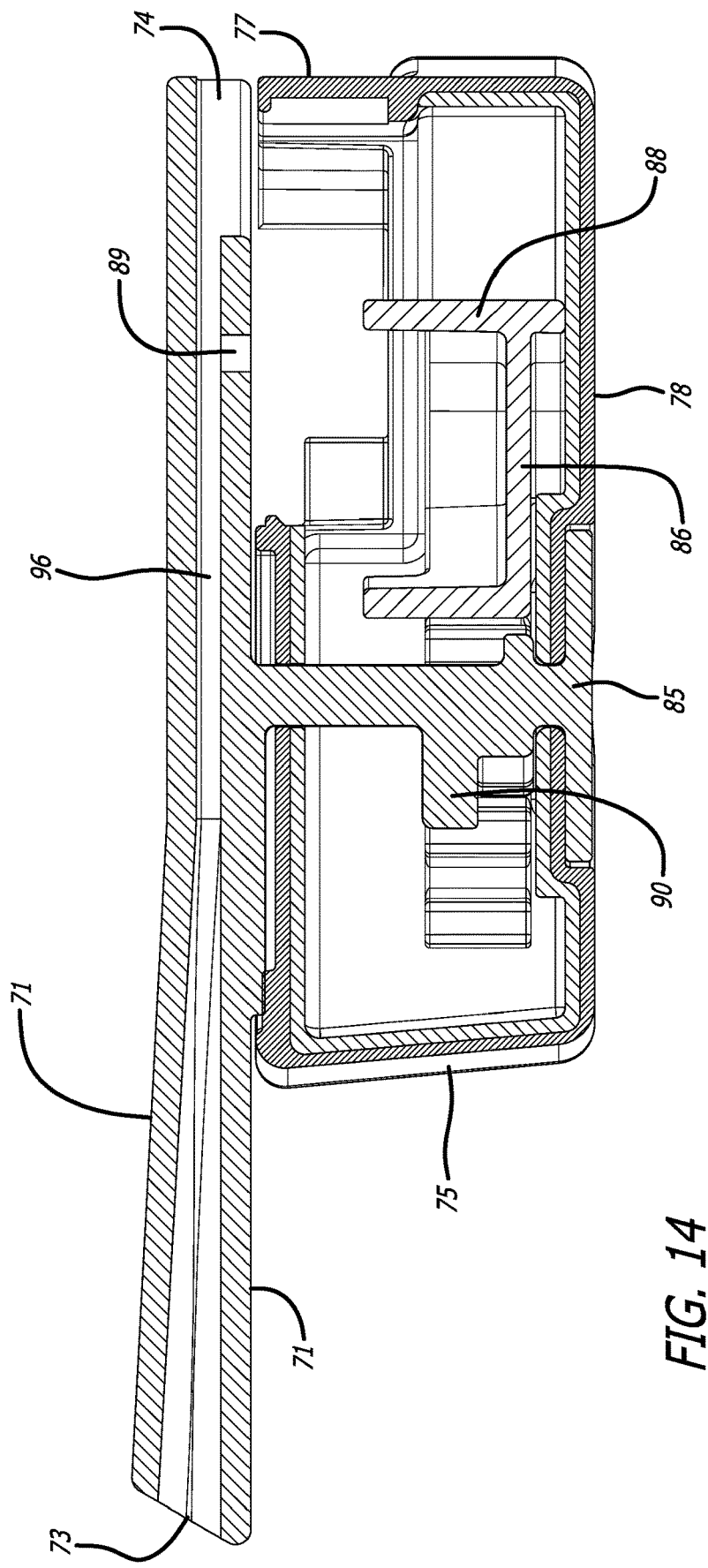
FIG. 14 a cross-sectional view through the mid-longitudinal axis of the inhaler in FIG. 11, similarly to FIG. 13, but without a cartridge.
Figure 15:
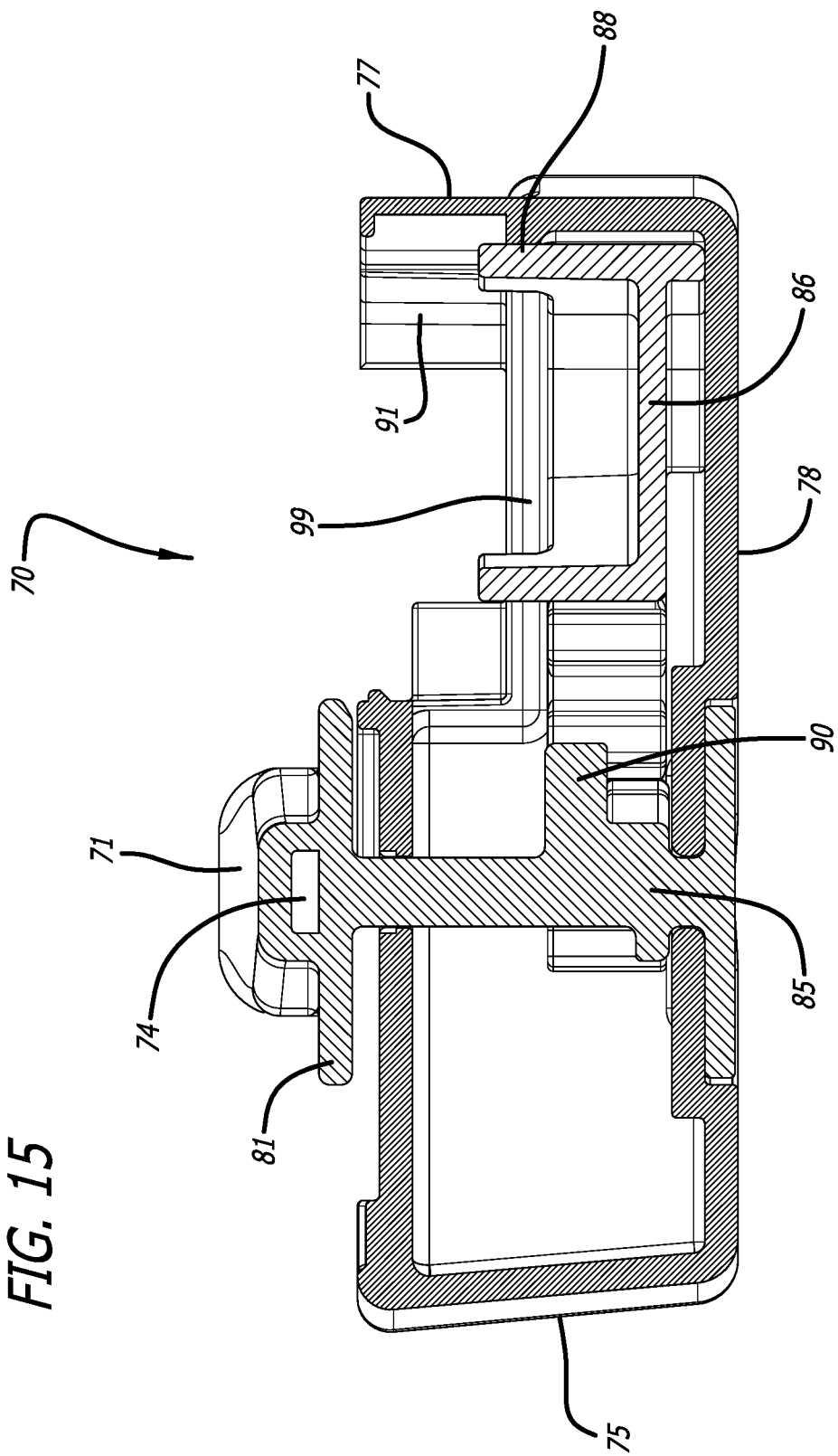
FIG. 15 depicts a cross-sectional view through the mid-longitudinal axis in a vertical plane of the inhaler in FIG. 12, similarly to FIG. 14, but without a cartridge and in an open configuration.

FIGS. 11-15 depicts yet another alternate inhaler, inhaler 70, wherein mouthpiece 71 is moveable relative to inhaler body 72 by a gear mechanism 85 which moves by rotation in the horizontal plane laterally to an angle of about 90° from the longitudinal axis A of inhaler 70 to allow access into the interior of inhaler body 72 to mount or dismount a cartridge. Mouthpiece 71 further comprises air inlet 74, air outlet 73, and a second air inlet in communication with the interior of inhaler body 72. FIG. 11 depicts inhaler 70 in a closed or dosing configuration. FIG. 12 depicts inhaler 70 in an open configuration for installing or loading a cartridge, as exemplified by cartridge 76. Inhaler 70 is designed with a substantially rectangular body 72 having a proximal end 75, distal end 77, bottom 78, right side 79, left side 80, and top 81 which is closed at one end and open at its distal end. Mouthpiece 71 also comprises lateral extensions 82 spanning from the center air conduit and configured as one piece which cover the inhaler body top surface 81. Top surface area 81 comprises a stop end 83 configured to prevent mouthpiece 71 from rotating beyond a perpendicular plane with inhaler body 72. Movement by rotation of mouthpiece 71 to the open position actuates a mounting and reconfiguring mechanism to be accessible at the open area of the top surface 81 of body 72 as seen in FIG. 12. FIGS. 13 and 14 depict mid-longitudinal sections of inhaler 70 with (FIG. 13)

and without (FIG. 14) a cartridge, respectively, to show the movement of rack 86 in the closed or dosing configuration by gear mechanism 90. Movement of mouthpiece 71 from right side 79 to left side 80 in horizontal plane to the inhaler body actuates the gear mechanism to move cup 92 relative to lid 93 by translational motion in a proximal direction to create an air flow passageway having air inlet 94 and air outlet 95 through the cup interior, which communicates with inlet 89 and air conduit 96 of inhaler 70 for emitting powder contained in cup 92. In this embodiment, the mounting and reconfiguring mechanism comprises a shelf structure 99 built within the top surface of mounting area 91 for placing the cartridge lid 93 which extends outwardly from cup 92 and rests on shelf structure 99 to be immobilized, while cup 92 is seated in rack 86 and the cartridge is in a powder containment configuration.

Figure 16:
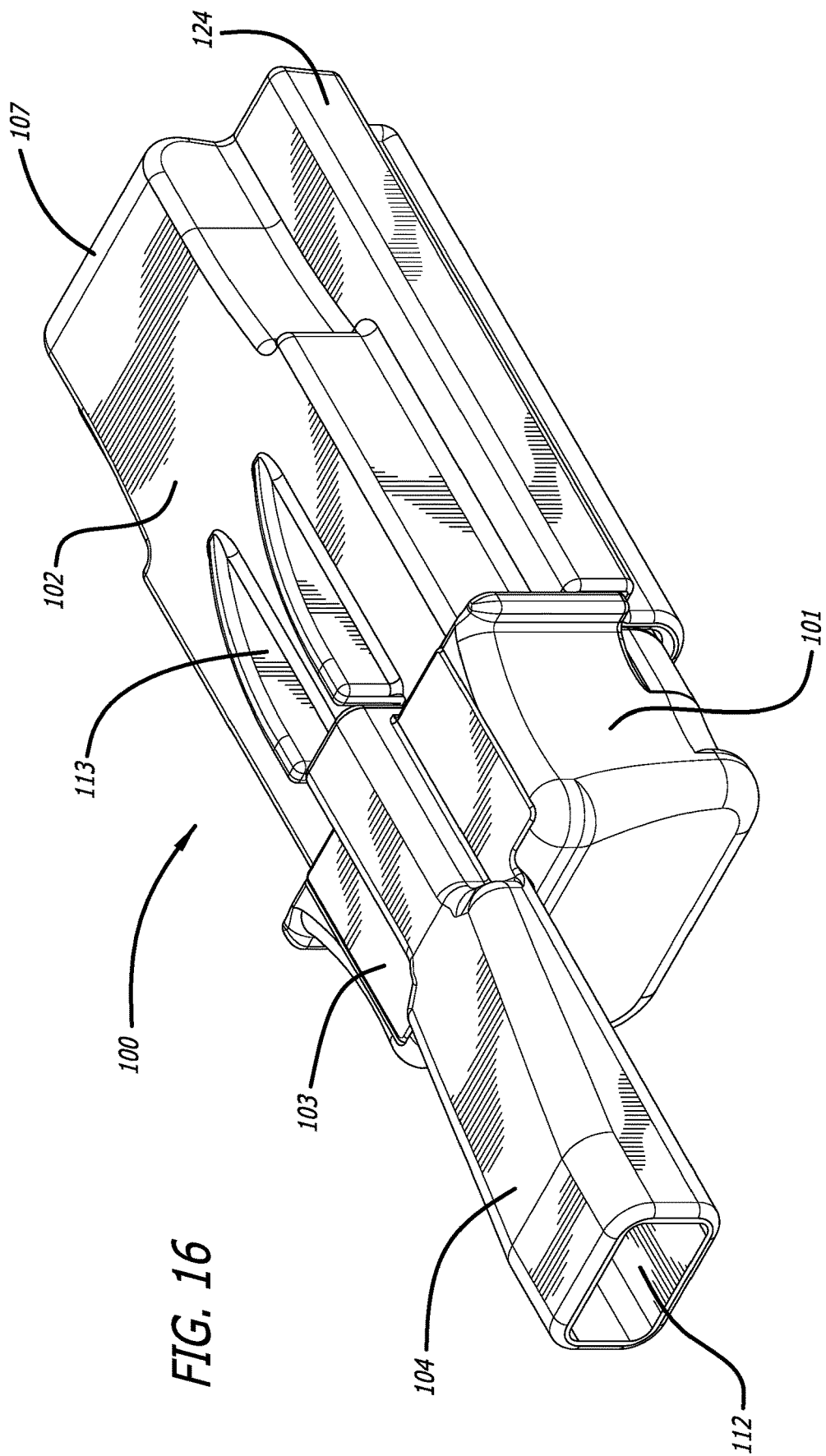
FIG. 16 depicts a perspective view of another alternate dry powder inhaler embodiment in a closed position and ready for use.
Figure 17:
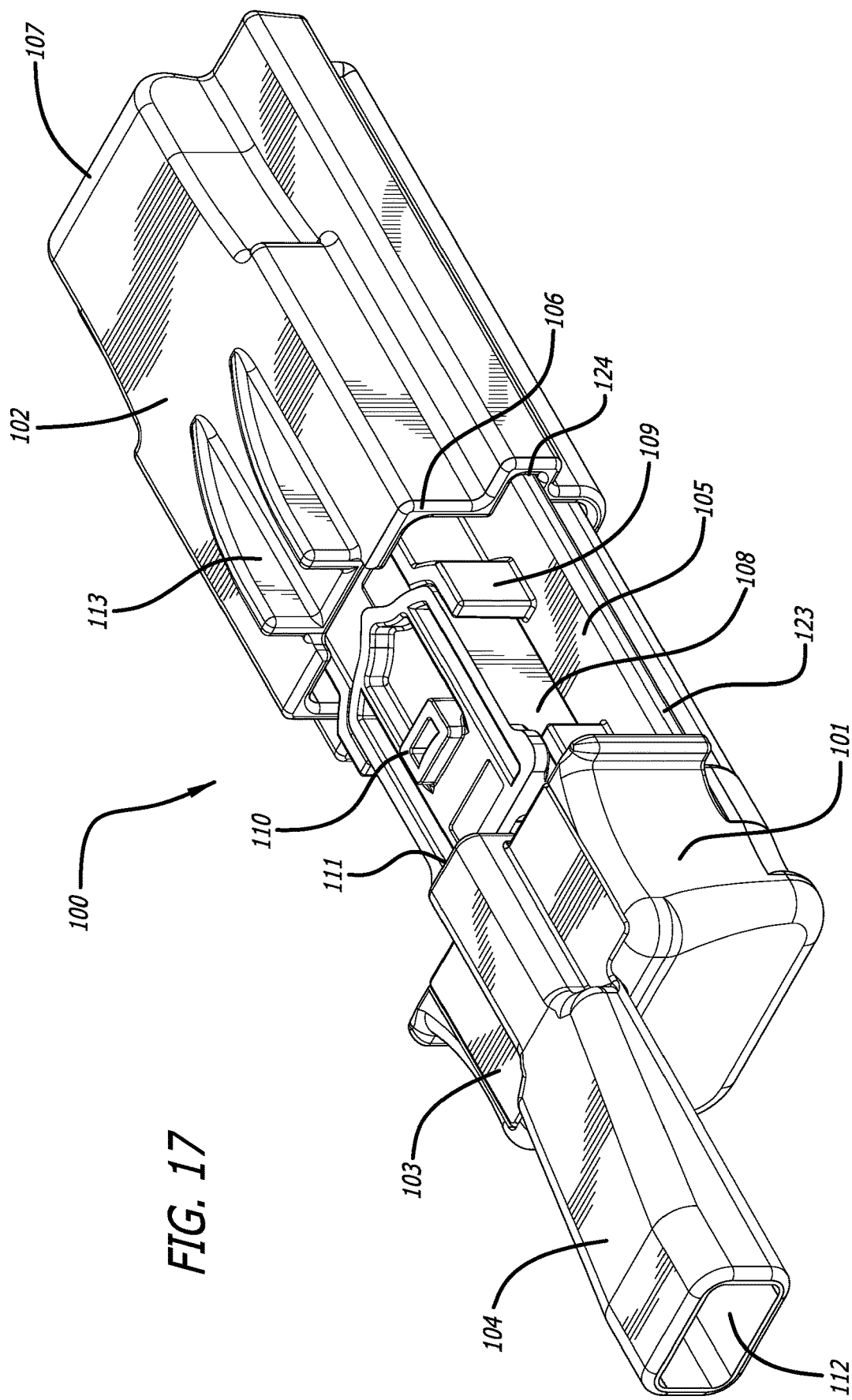
FIG. 17 depicts the embodiment of FIG. 16 in an open, cartridge loading/unloading position and having a cartridge installed in the cartridge mounting area, wherein the cartridge is in a powder containment configuration.

In yet another dry powder inhaler embodiment depicted in FIGS. 16-20, there is provided inhaler 100 comprising a two part assembly, an inhaler body 101 and a housing or cover 102 which envelops portions of inhaler body 101. In one embodiment illustrated in FIG. 16, inhaler 100 comprises inhaler body 101 which comprises a proximal portion 103 comprising mouthpiece 104, and a distal portion 105, and comprising a housing 102 which is structurally configured as a slip-on cover over portions of the body and internal parts of the inhaler; wherein housing 102 as depicted in FIG. 17 comprises a distal end 107 and a proximal end 106, and proximal end 106 has an opening for adapting and encapsulating a portion of inhaler body 105 and also comprises projections 113 from its upper surface which direct airflow to enter mouthpiece 104 air conduit 115 upon inhalation. In an embodiment, the proximal end 106 contacts or abuts inhaler body 101 so as to close inhaler 100 from the external environment as illustrated in FIG. 16. From the closed configuration, inhaler 100 is opened by movement of the housing 102 in a distal direction over body 105 in a translational motion to attain an inhaler loading and/or unloading position to insert or remove a cartridge. FIG. 17 illustrates inhaler 100 in an open configuration wherein housing 102 has been pulled apart distally to allow access into inhaler body distal portion 105. In this and other embodiments, FIG. 17 depicts cartridge 108 installed in cartridge mounting area 109 of inhaler 100 and showing the lid and outlet port 110 which communicates with air conduit in mouthpiece spanning inlet 111 and outlet 112 through secondary inlet port in mouthpiece 104. Mounting area 109 is configured in the shape of the cartridge 108 for proper fitting and to indicate a visual cue to a user for proper orientation of a cartridge during installation.

Figure 18:
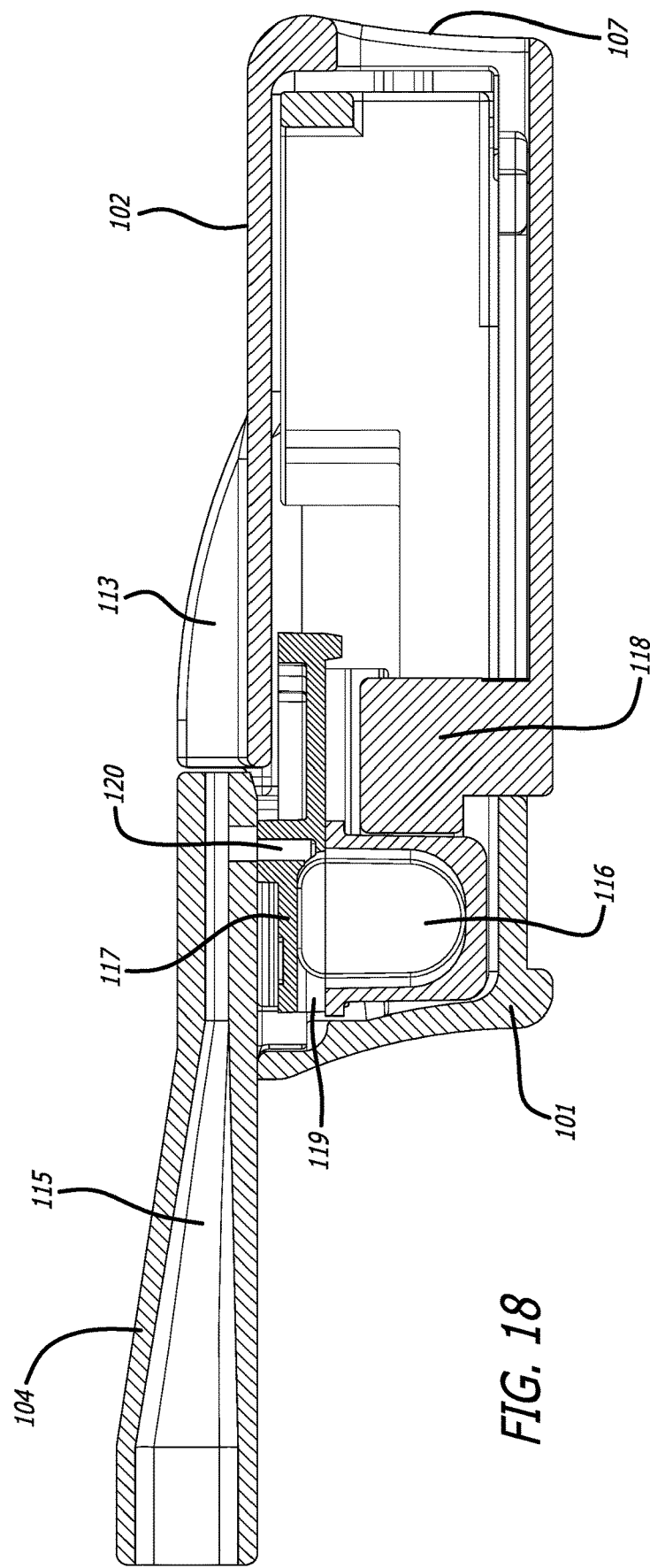
FIG. 18 depicts a cross-sectional view through the mid-longitudinal axis of the dry powder inhaler of FIG. 16 showing the closed inhaler containing a cartridge in a powder dosing configuration showing the inhaler airflow pathway formed through the cartridge chamber.

FIG. 18 also depicts a mid-longitudinal section of inhaler 100 in a closed, dosing configuration illustrating the position of a cartridge cup 116 relative to lid 117 upon translational movement of the housing 102 over body 105 in a distal to proximal direction which caused cartridge 108 displacement from a containment configuration to a dosing configuration, wherein cartridge container cup 116 is pushed to the dosing configuration by a protruding rigid element in the interior bottom portion of housing 102 that extends beyond the opening 106 at the proximal end 106 in a horizontal plane. Protruding rigid element 118 can also comprise one or more vertical projections to facilitate removal of cartridge 108 after use. Moreover, in a closed configuration, a cartridge installed in inhaler 100 is reconfigured to form an additional air passageway through cartridge cup 116 from air inlet 119 and air outlet 120 and with the mouthpiece for ambient air to access a dry powder in cartridge 108 in the dosing configuration upon inhalation. In this and other embodiments, upon an inhalation air enters the air passageway of cartridge 108 in a dosing configuration through air inlet 119, and aerosolizes a dry powder particles to be entrained in the air and aerosolized powder then exits through air outlet 120, which is in communication with an air inlet in the air conduit 115 of mouthpiece 104 and in mouthpiece 104 air passageway further shearing of powder occurs prior to powder exiting through mouthpiece outlet 112.

In one embodiment, the body 101 of the inhaler comprises a mouthpiece integrally formed at a proximal end of body 101 and comprises air conduit 115 which is in communication with the interior of body 101 and housing 102 and can be in direct communication with an air outlet 120 of cartridge 108 installed in inhaler 100 and with ambient air. Inhaler body 101 also comprises a cartridge mounting area 121, which is continuous in structure with the mouthpiece and has a distal part 105 and a proximal part 103; wherein proximal part 103 and distal part 105 form one single piece with mouthpiece 104 and distal part 105 is insertable into housing 102. In one embodiment illustrated in FIGS. 17 and 20, body 101 and housing 102 can be pulled apart manually to attain an inhaler open configuration for access to an internal compartment. In an open configuration of this embodiment, cartridge 108 comprising a dry powder can be loaded or installed in cartridge mounting area of body part 105 in a proper orientation as indicated by visual cues, and body 105 and housing 102 can be pushed or pulled to either open or close inhaler 100. In one embodiment, the housing is moveable over distal part 105 of body 101 from an open to a close configuration, and together they close inhaler 100 when they are in contact with one another.

Figure 19:
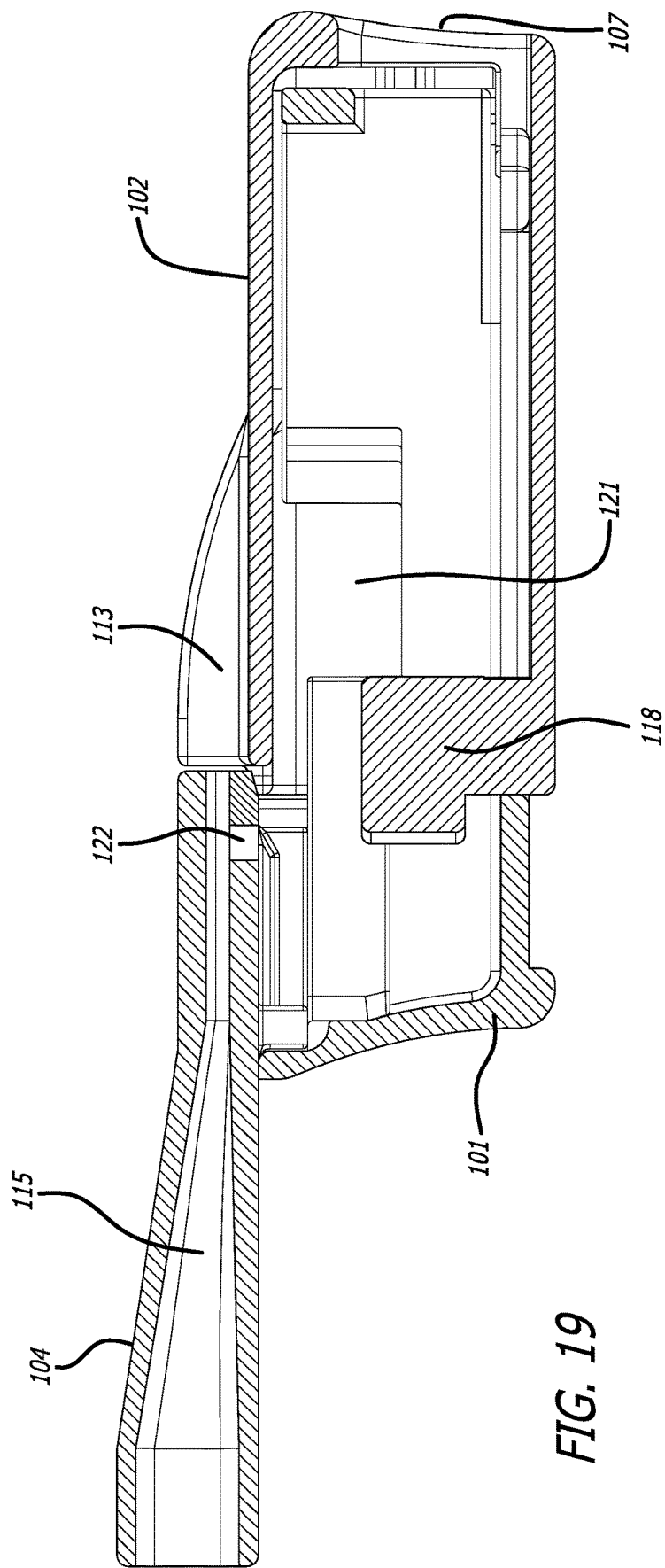
FIG. 19 depicts a cross-sectional view through the mid-longitudinal axis of the inhaler in FIG. 16, similarly to FIG. 18, but without a cartridge.
Figure 20:
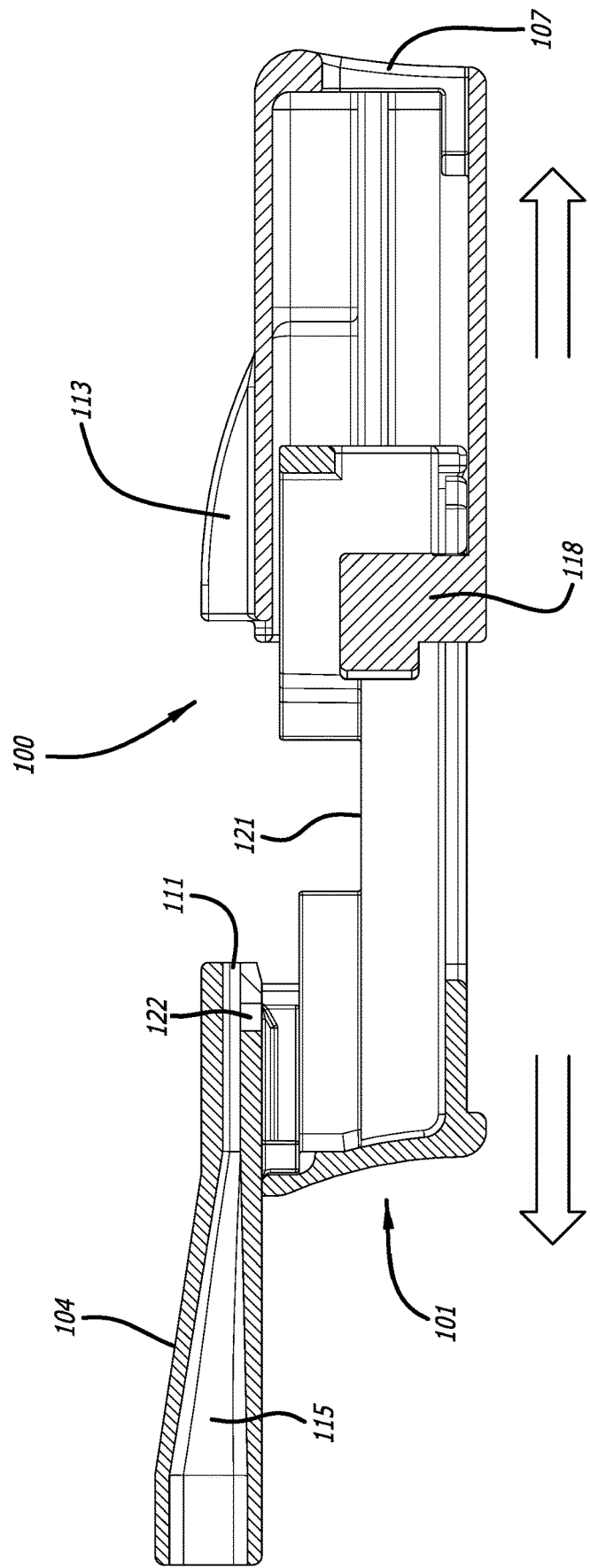
FIG. 20 depicts a cross-sectional view through the mid-longitudinal axis in a vertical plane of the inhaler in FIG. 17, similarly to FIG. 19, but without a cartridge and in an open configuration.

FIGS. 18 and 19 depict inhaler 100 in a closed or dosing configuration, wherein the closing action effectuates movement of the cartridge 108 to a dosing position and wherein the cartridge cup is further pushed with protruding element 118 to be reconfigured independently of lid 117 to form of an air conduit through cartridge 108 mounted in the cartridge mounting area 109. In this configuration, the inhaler attains a dosing configuration for a powder in cup 116 to be emitted from the inhaler upon an oral inhalation by a user through mouthpiece 104. In this embodiment depicted in FIG. 18 and dosing configuration, the body and the housing abut one another and are adapted tightly together by one or more anti-slip structures to prevent the inhaler from disassembly. Examples of anti-slip features are snap rings, or detents, which can generate a sound to alert a user that the inhaler is ready for use. FIGS. 17 and 20 depict inhaler 100 in an open configuration. In this embodiment inhaler 100 is substantially rectangular in shape with the distal and proximal sides being smaller in length; wherein movement of housing 102 over body part 105, or vice versa, is effectuated by pulling or pushing and inhaler body 105, which movement is facilitated by body comprising guide rails or tracks 123 extending outwardly from the longer sides (a first side and a second side) of inhaler body 105 in a longitudinal plane. In this embodiment, inhaler body 105 is designed to have an opening at its distal end to match the opening at the distal end of the housing to allow and guide ambient air into the interior chamber of inhaler 100 upon inhalation. Inhaler housing 102 is also fittingly configured to have grooves or slots 124 for gliding over guide rails 123 during movement and also comprises one or more stop ends to prevent disassembly of inhaler 100. Pushing or protruding element 118 is designed for positioning a cartridge in a dosing configuration after installation and closing of inhaler 100. The protruding or pushing element 118 moves cartridge cup or container 116 relative to cartridge lid 117 to form an air passageway through the cartridge and create an air inlet 119 and an air outlet 120 to allow aerosolization of a powder in the cup during an inhalation for delivering the aerosolized particles to the inhaler mouthpiece air conduit 115 and into the user.

In versions of inhaler 100, the distal portion of the housing comprises parallel structures or flanges for engaging portions of the body of the inhaler to form a securing mechanism, for example, for locking the body of the inhaler with the housing to secure the two parts together and maintain the dosing configuration. In an embodiment, distal portion 107 of housing 102 has an opening at its distal end for communicating with the interior of inhaler 100 and an opening 106 which is configured to slide over inhaler body 105. Distal portion 107 of housing 102 also comprises an external surface, an interior surface and a chamber configured to envelop inhaler body 105. In one embodiment, housing 102 comprises parallel wing-like structure 113 on its upper surface for directing airflow into mouthpiece 104 during an inhalation. Inhaler body part 105 is designed with a groove in its mid-longitudinal plane for adapting protruding or pushing element 118 to glide to push the cartridge or to stop the housing from disassembling. Inhaler body part 105 is also configured to have detents at its distal end for engaging with housing 102 and securing the two inhaler parts.

Cartridge embodiments for use with the inhalers are described in U.S. Pat. No. 8,424,518, which disclosure is incorporated by reference in its entirety. In summary, a cartridge for use with the inhaler embodiments disclosed herewith comprises two parts, although other embodiments may be envisioned. The cartridges are configured to contain a dry powder medicament in a storage, tightly sealed or contained position and can be reconfigured within an inhaler from a powder containment position to an inhalation or dosing configuration. In certain embodiments, the cartridge comprises a lid and a cup having one or more apertures, a containment configuration and dosing configuration, an outer surface, an inner surface defining an internal volume; and the containment configuration restricts communication to the internal volume and the dispensing configuration forms an air passage through said internal volume to allow an air flow to enter and exit the internal volume in a predetermined manner. For example, the cartridge container can be configured so that an airflow entering the cartridge air inlet is directed across the air outlets within the internal volume to meter the medicament leaving the cartridge so that rate of discharge of a powder is controlled; and wherein airflow in the cartridge can tumble substantially perpendicular to the air outlet flow direction, mix and fluidize a powder in the internal volume prior to exiting through dispensing apertures. Cartridges for use with the instant inhalers can be provided in individual blisters or grouped in a blister depending in the need of the subject or the hygroscopicity of the formulation with respect to stability of powder and/or the active ingredient.

In embodiments described herein, the dry powder inhaler and cartridge form an inhalation system which can be structurally configured to effectuate a tunable or modular airflow resistance, as it can be effectuated by varying the cross-sectional area or geometries of the air conduits at any section of the airflow pathway of the system. In one embodiment, the dry powder inhaler system geometries of the air conduits can generate an airflow resistance value of from about 0.065 to about 0.200 (√kPa)/liter per minute. In other embodiments, a check valve may be employed to prevent air flow through the inhaler until a desired pressure drop, such as 4 kPa has been achieved, at which point the desired resistance reaches a value within the range given herewith.

In yet another embodiment, an inhalation system for delivering a dry powder formulation to a patient is provided. The system comprises an inhaler including a container mounting area configured to receive a container and a mouthpiece having at least two inlet apertures and at least one exit aperture; wherein one inlet aperture of the at least two inlet apertures is in fluid communication with the container area, and one of the at least two inlet apertures is in fluid communication with the at least one exit aperture via a flow path configured to bypass the container area to deliver the dry powder formulation to the patient; wherein the flow conduit configured to bypass the container area delivers 30% to 90% of the total flow going through the inhaler during an inhalation.

In another embodiment, a dry powder inhalation system for delivering a dry powder formulation to a patient is also provided. The system comprises a dry powder inhaler including a mounting and reconfiguring region for a cartridge; said dry powder inhaler and cartridge combined are configured to have at least two airflow pathways which are rigid flow conduits in a dosing configuration and a plurality of structural regions that provide a mechanism for powder deagglomeration of the inhalation system in use; wherein at least one of the plurality of mechanisms for deagglomeration is an agglomerate size exclusion aperture in the container region having a smallest dimension between 0.5 mm and 3 mm.

In embodiments disclosed herein, a dry powder formulation can consist of a crystalline powder, an amorphous powder, or combinations thereof, wherein the powder is dispensed with consistency from the inhaler in less than about 2 seconds. The present inhaler system has a high resistance value of approximately 0.065 to about 0.200 (√kPa)/liter per minute. Therefore, in the system comprising a cartridge, peak inhalation pressure drops applied of between 2 and 20 kPa produce resultant peak flow rates of about through the system of between 7 and 70 liters per minute. These flow rates result in greater than 75% of the cartridge contents dispensed in fill masses between 1 and 30 mg, or up to 50 mg of powder. In some embodiments, these performance characteristics are achieved by end users within a single inhalation maneuver to produce cartridge dispense percentage of greater than 90%. In certain embodiments, the inhaler and cartridge system are configured to provide a single dose by discharging powder from the inhaler as a continuous flow, or as one or more pulses of powder delivered to a patient. In an embodiment, an inhalation system for delivering a dry powder formulation to a patient's lung(s) is provided, comprising a dry powder inhaler configured to have flow conduits with a total resistance to flow in a dosing configuration ranging in value from 0.065 to about 0.200 (kPa)/liter per minute. In this and other embodiments, the total resistance to flow of the inhalation system is relatively constant across a pressure differential range of between 0.5 kPa and 7 kPa.

The structural configuration of the inhaler allows the deagglomeration mechanism to produce respirable fractions greater than 50% and particles of less than 5.8 μm. The inhalers can discharge greater than 85% of a powder medicament contained within a container during an inhalation maneuver. Generally, the inhalers herein depicted herewith can discharge greater that 90% of the cartridge contents or container contents in less than 3 seconds at pressure differentials between 2 and 5 kPa with fill masses ranging up to 30 mg or 50 mg.

While the present inhalers are primarily described as breath-powered, in some embodiments, the inhaler can be provided with a source for generating the pressure differential required to deagglomerate and deliver a dry powder formulation. For example, an inhaler can be adapted to a gas powered source, such as compressed gas stored energy source, such as from a nitrogen can, which can be provided at the air inlet ports. A spacer can be provided to capture the plume so that the patient can inhale at a comfortable pace.

In embodiments described herewith, the inhaler can be provided as a reusable inhalers for delivering a single unit dose. A reusable inhaler means that it can be used multiple times which can be predetermined depending on the formulation to be delivered and discarded once it has reached its maximal usage.

These present devices and systems are useful in pulmonary delivery of powders with a wide range of characteristics. Embodiments include systems comprising an inhaler, an integral or installable unit dose cartridge comprising the desirable powder doses. Pulmonary delivery of powders include carriers and excipients which safety and efficacy have been proven in commercially available products. An exemplary embodiment is fumaryl diketopiperazine, also known as 3,6-bis(N-fumaryl-4-aminobutyl)-2,5-diketopiperazine; FDKP. FDKP produces microparticles which can be self-assembled aggregates of crystalline plates in suspension; can be manufactured as amorphous powders or combinations thereof depending on the process used as disclosed in U.S. Pat. Nos. 7,820,676; 7,709,639 and 8,551,528, which disclosures are incorporated herein by reference for their relevant subject matter. Dry powders manufactured using diketopiperazines can be made by lyophilizing, or spray-drying solution or suspensions of the various desired formulations. DKP crystalline microparticles with a specific surface area (SSA) of between about 35 and about 67 m2/g exhibit characteristics beneficial to delivery of drugs to the lungs such as improved aerodynamic performance and improved drug adsorption. In some embodiments, high capacity crystalline FDKP microparticles for use in formulations containing peptides, for example, have a specific surface area which is less than 35 m2/g and specific surface area of these particles can range from about 19 m2/g to about 30 m2/g or from about 28 m2/g to about 71 m2/g, or from about 19 m2/g to about 57 m2/g depending on the amount of active agent. In some embodiments, microparticles of FDKP with a peptide active agent as exemplified by insulin can have specific surface area ranging from about 4 m2/g to about 30 m2/g and have improved aerodynamic properties as measured by flyability and flowability.

In one embodiment, the dry powder medicament may comprise, for example, a diketopiperazine and a pharmaceutically active ingredient. In this embodiment, the pharmaceutically active ingredient or active agent can be any type depending on the disease or condition to be treated. In another embodiment, the diketopiperazine can include, for example, symmetrical molecules and asymmetrical diketopiperazines having utility to form particles, microparticles and the like, which can be used as carrier systems for the delivery of active agents to a target site in the body. The term "active agent" is referred to herein as the therapeutic agent, or molecule such as protein or peptide or biological molecule, and small molecules, including neurotransmitters that can be encapsulated, associated, joined, complexed or entrapped within or adsorbed onto the diketopiperazine formulation. Any form of an active agent can be combined with a diketopiperazine. The drug delivery system can be used to deliver biologically active agents having therapeutic, prophylactic or diagnostic activities.

The fumaryl diketopiperazine 3,6-bis(N-fumaryl-4-aminobutyl)-2,5-diketopiperazine; FDKP) is one preferred diketopiperazine for pulmonary applications:

FDKP

Microparticles for pulmonary delivery having a diameter of between about 0.5 and about 10 μm can reach the lungs and can reach the systemic circulation and deliver an active agent. A diameter of less than about 10 μm is required to navigate the turn of the throat and a diameter of about 0.5 μm or greater is required to avoid being exhaled. Generally, microparticles having diameters greater than 10 μm or greater than 20 μm are useful for local delivery to the respiratory tract and lungs.

Microparticles having a diameter of between about 0.5 and about 10 microns can reach the lungs, successfully passing most of the natural barriers. A diameter of less than about 10 microns is required to navigate the turn of the throat and a diameter of about 0.5 microns or greater is required to avoid being exhaled. Embodiments disclosed herein show that microparticles with a specific surface area (SSA) of between about 4 and about 71 m2/g exhibit characteristics beneficial to delivery of drugs to the lungs such as improved aerodynamic performance and improved drug adsorption. In some embodiments herewith, there is provided a composition comprising crystalline fumaryl diketopiperazine (FDKP) microparticles having a specific trans isomer content of about 35 to about 65%, or 45 to about 63%, or 45 to about 60%.

In certain embodiments, a diketopiperazine based composition for pulmonary delivery is provided with an active agent, wherein the diketopiperazine is fumaryl diketo piperazine and comprises a plurality of substantially uniformly formed, microcrystalline particles, wherein the particles have a substantially hollow spherical structure and comprise a shell comprising crystallites of a diketopiperazine that do not self-assemble, and the particles have a volumetric mean geometric diameter less than equal to 5 μm; wherein the particles are formed by a method comprising the step of combining diketopiperazine in a solution and a solution of acetic acid without the presence of a surfactant and concurrently homogenizing in a high shear mixer at high pressures of up to 2,000 psi to form a precipitate; washing the precipitate in suspension with deionized water; concentrating the suspension and drying the suspension in a spray drying apparatus.

In some embodiments, a diketopiperazine-based composition for pulmonary delivery is provided with an active agent, wherein the diketopiperazine is a salt of fumaryl diketopiperazine, including sodium, magnesium, and the composition comprises the amorphous powder.

A system for the delivery of an inhalable dry powder is also provided, comprising: a) a dry powder comprising a medicament, and b) an inhaler comprising a powder containing cartridge, the cartridge comprising a gas inlet and a gas outlet, and a housing in which to mount the cartridge and defining two flow pathways, a first flow pathway allowing gas to enter the gas inlet of the cartridge, a second flow pathway allowing gas to bypass the enclosure gas inlet, and a mouthpiece and upon applying a pressure drop of ≥2 kPa across the inhaler plume of particles is emitted from the mouthpiece wherein 50% of said emitted particles have a VMAD of ≤10 μm, wherein flow bypassing the cartridge gas inlet is directed to impinge upon the flow exiting the enclosure substantially perpendicular to the gas outlet flow direction.

Active agents for use in the compositions and methods described herein can include any pharmaceutical agent. These can include, for example, synthetic organic compounds, proteins and peptides, polysaccharides and other sugars, lipids, inorganic compound, and nucleic acid sequences, having therapeutic, prophylactic, or diagnostic activities. Peptides, proteins, and polypeptides are all chains of amino acids linked by peptide bonds.

Examples of active agents that can be delivered to a target or site in the body using the diketopiperazine formulations, include hormones, anticoagulants, immunomodulating agents, vaccines, cytotoxic agents, neurotransmitters agonists and antagonists, antibiotics, vasoactive agents, neuroactive agents, anaesthetics or sedatives, steroids, decongestants, antivirals, antisense, antigens, and antibodies. More particularly, these compounds include insulin, heparin (including low molecular weight heparin), calcitonin, felbamate, sumatriptan, parathyroid hormone and active fragments thereof, growth hormone, erythropoietin, AZT, DDI, granulocyte macrophage colony stimulating factor (GM-CSF), lamotrigine, chorionic gonadotropin releasing factor, luteinizing releasing hormone, beta-galactosidase, exendin, vasoactive intestinal peptide, and argatroban. Antibodies and fragments thereof can include, in a non-limiting manner, anti-SSX-241-49 (synovial sarcoma, X breakpoint 2), anti-NY-ESO-1 (esophageal tumor associated antigen), anti-PRAMS (preferentially expressed antigen of melanoma), anti-PSMA (prostate-specific membrane antigen), anti-Melan-A (melanoma tumor associated antigen) and anti-tyrosinase (melanoma tumor associated antigen).

In certain embodiments, a dry powder formulation for delivering to the pulmonary circulation comprises an active ingredient or agent, including a peptide, a protein, a hormone, analogs thereof or combinations thereof, wherein the active ingredient is insulin, calcitonin, growth hormone, erythropoietin, granulocyte macrophage colony stimulating factor (GM-CSF), chorionic gonadotropin releasing factor, luteinizing releasing hormone, follicle stimulating hormone (FSH), vasoactive intestinal peptide, parathyroid hormone (including black bear PTH), parathyroid hormone related protein, glucagon-like peptide-1 (GLP-1), exendin, oxyntomodulin, peptide YY, interleukin 2-inducible tyrosine kinase, Bruton's tyrosine kinase (BTK), inositol-requiring kinase 1 (IRE1), or analogs, active fragments, PC-DAC-modified derivatives, or 0-glycosylated forms thereof. In particular embodiments, the pharmaceutical composition or dry powder formulation comprises fumaryl diketopiperazine and the active ingredient is one or more selected from insulin, parathyroid hormone 1-34, GLP-1, oxyntomodulin, peptide YY, heparin, adiponectin, cholecystokinin (CCK), secretin, gastrin, glucagon, motilin, somatostatin, brain natriuretic peptide (BNP), atrial natriuretic peptide (ANP), IGF-1, growth hormone releasing factor (GHRF), integrin beta-4 precursor (ITB4) receptor antagonist, nociceptin, nocistatin, orphanin FQ2, calcitonin, CGRP, angiotensin, substance P, neurokinin A, cannabinoids, including, tetrahydrocannabinol, cannabidiol; pancreatic polypeptide, neuropeptide Y, delta-sleep-inducing peptide, vasoactive intestinal peptide, combinations of one or more active agents thereof and/or analogs thereof.

Other active agents that can be used in dry powders for pulmonary delivery include, treprostinil, salmeterol, epinephrine, tacrolimus, vancomycin, linezolid, filgastrin, fentanyl, cannabinoids, including cannabidiol and tetrahydrocannabinol, palonosetron, amphotericin B, phosphodiesterase inhibitors, including, PDE5 inhibitors such as sildenafil, avanafil, verdenafil and tadalafil; prostaglandins, including, prostacyclin, neurotransmitter agonists, neurotransmitter antagonists, including anti-nociceptive agents, including opioid analgesics such as delta opioid agonists and antagonists, kappa opioid receptor agonists and antagonists, μ opioid receptor agonist and antagonists and/or combinations of one or more of the aforementioned active agents.

The present disclosure also provides improved microcrystalline particles, compositions, methods of making the particles, and methods that allow for improved delivery of drugs to the lungs for treating diseases and disorders in a subject. Embodiments disclosed herein achieve improved delivery by providing crystalline diketopiperazine compositions comprising microcrystalline diketopiperazine particles having high capacity for drug adsorption yielding powders having high drug content of one or more active agents. Powders made with the present microcrystalline particles can deliver increased drug content in lesser amounts of powder dose, which can facilitate drug delivery to a patient. The powders can be made by various methods including, methods utilizing surfactant-free solutions or solutions comprising surfactants depending on the starting materials.

In alternate embodiments disclosed herein can comprise a dry powder for inhalation comprising a plurality of substantially uniform, microcrystalline particles, wherein the microcrystalline particles can have a substantially hollow spherical structure and comprise a shell which can be porous, comprising crystallites of a diketopiperazine that do not self-assemble in a suspension or in solution. In certain embodiments, the microcrystalline particles can be substantially hollow spherical and substantially solid particles comprising crystallites of the diketopiperazine depending on the drug and/or drug content provided and other factors in the process of making the powders. In one embodiment, the microcrystalline particles comprise particles that are relatively porous, having average pore volumes of about 0.43 $cm^3/g$, ranging from about 0.4 $cm^3/g$ to about 0.45 $cm^3/g$, and average pore size ranging from about 23 nm to about 30 nm, or from about 23.8 nm to 26.2 nm as determined by BJH adsorption.

Certain embodiments disclosed herein comprises powders comprising a plurality of substantially uniform, microcrystalline particles, wherein the particles have a substantially spherical structure comprising a shell which can be porous, and the particles comprise crystallites of a diketopiperazine that do not self-assemble in suspension or solution, and have a volumetric median geometric diameter less than 5 μm; or less than 2.5 μm.

In a particular embodiment herein, up to about 92% of the microcrystalline particles have a volumetric median geometric diameter of 5.8 μm. In one embodiment, the particle's shell is constructed from interlocking diketopiperazine microcrystals having one or more drugs adsorbed on their surfaces. In some embodiments, the particles can entrap the drug in their interior void volume and/or combinations of the drug adsorbed to the crystallites' surface and drug entrapped in the interior void volume of the spheres.

In certain embodiments, a diketopiperazine composition comprising a plurality of substantially uniformly formed, microcrystalline particles is provided, wherein the particles have a substantially hollow spherical structure and comprise a shell comprising crystallites of a diketopiperazine that do not self-assemble; wherein the particles are formed by a method comprising the step of combining diketopiperazine having a trans isomer content ranging from about 45% to 65% in a solution and a solution of acetic acid without the presence of a surfactant and concurrently homogenizing in a high shear mixer at high pressures of up to 2,000 psi to form a precipitate; washing the precipitate in suspension with deionized water; concentrating the suspension and drying the suspension in a spray drying apparatus.

The method can further comprise the steps of adding with mixing a solution comprising an active agent or an active ingredient such as a drug or bioactive agent prior to the spray drying step so that the active agent or active ingredient is adsorbed and/or entrapped on or within the particles. Particles made by this process can be in the submicron size range prior to spray-drying.

In certain embodiments, a diketopiperazine composition comprising a plurality of substantially uniformly formed, microcrystalline particles is provided, wherein the particles have a substantially hollow spherical structure and comprise a shell comprising crystallites of a diketopiperazine that do not self-assemble, and the particles have a volumetric mean geometric diameter less than equal to 5 μm; wherein the particles are formed by a method comprising the step of combining diketopiperazine in a solution and a solution of acetic acid without the presence of a surfactant and concurrently homogenizing in a high shear mixer at high pressures of up to 2,000 psi to form a precipitate; washing the precipitate in suspension with deionized water; concentrating the suspension and drying the suspension in a spray drying apparatus.

The method can further comprise the steps of adding with mixing a solution comprising an active agent or an active ingredient such as a drug or bioactive agent prior to the spray drying step so that the active agent or active ingredient is adsorbed and/or entrapped on or within the particles. Particles made by this process can be in the submicron size range prior to spray-drying.

In certain embodiments, a diketopiperazine composition comprising a plurality of substantially uniformly formed, microcrystalline particles is provided, wherein the microcrystalline particles have a substantially hollow spherical structure and comprise a shell comprising crystallites of a diketopiperazine that do not self-assemble, and the particles have a volumetric mean geometric diameter less than equal to 5 μm; wherein the particles are formed by a method comprising the step of combining diketopiperazine in a solution and a solution of acetic acid without the presence of a surfactant and without the presence of an active agent, and concurrently homogenizing in a high shear mixer at high pressures of up to 2,000 psi to form a precipitate; washing the precipitate in suspension with deionized water; concentrating the suspension and drying the suspension in a spray drying apparatus.

In certain embodiments wherein the starting material comprising the active ingredient is an extract exhibiting a high degree of viscosity, or a substance having a honey like viscous appearance, the microcrystalline particles are formed as above and by washing them in water using tangential flow filtration prior to combining with the extract or viscous material. After washing in water, the resultant particle suspension is lyophilized to remove the water and re-suspended in an alcohol solution, including ethanol or methanol prior to adding the active ingredient as a solid, or in a suspension, or in solution. In one embodiment, optionally, the method of making the composition comprises the step of adding any additional excipient, including one or more, amino acid, such as leucine, isoleucine, norleucine, methionine or one or more phospholipids, for example, 1,2-dipalmitoyl-sn-glycero-3-phosphocholine (DPPC) or 1,2-distearoyl-sn-glycero-3-phosphocholine (DSPC), concurrently with the active ingredient or subsequent to adding the active ingredient, and prior to spray drying. In certain embodiments, Formation of the composition comprises the step wherein the extract comprising desired active agents is optionally filtered or winterized to separate and remove layers of unwanted materials such as lipids to increase its solubility.

The method can further comprise the steps of adding with mixing a solution, the mixing can optionally be performed with or without homogenization in a high shear mixer, the solution comprising an active agent or an active ingredient such as a drug or bioactive agent prior to the spray drying step so that the active agent or active ingredient is adsorbed and/or entrapped on or within the particles. Particles made by this process can be in the submicron size range prior to spray-drying, or the particles can be formed from the solution during spray-drying.

In some embodiments herewith, the drug content can be delivered on crystalline powders using FDKP and which are lyophilized or sprayed dried at contents to about 10%, or about 20%, or about 30% or higher. In embodiments using microcrystalline particles formed from FDKP, or FDKP disodium salt, and wherein the particles do not self-assemble and comprise submicron size particles, drug content can typically be greater than 0.01% (w/w). In one embodiment, the drug content to be delivered with the microcrystalline particles of from about 0.01% (w/w) to about 75% (w/w); from about 1% to about 50% (w/w), from about 10% (w/w) to about 25% (w/w), or from about 10% to about 20% (w/w), or from 5% to about 30%, or greater than 25% depending on the drug to be delivered. An example embodiment wherein the drug is a peptide such as insulin, the present microparticles typically comprise approximately 10% to 45% (w/w), or from about 10% to about 20% (w/w) insulin. In certain embodiments, the drug content of the particles can vary depending on the form and size of the drug to be delivered. In In an embodiment, the compositions for delivering with the inhalers herein can comprise fumaryl diketopiperazine crystalline particles and an active agent such as cannabinoids, including tetrahydrocannabinol (THC) and/or cannabidiol, treprostinil, palonosetron, parathyroid hormone, sildenafil, or epinephrine. In composition wherein a cannabinoid is used as an active agent, the cannabinoid, including, derivatives and/or analog thereof content can be up to 40% (w/w) with powder delivery greater than 40% of the inhaler content. In some embodiments, the cannabinoid content in the composition can range from about 1% to about 30%, from about 5% to about 25% (w/w) of the powder content. The compositions herein can also comprise one or more excipients including amino acids such as leucine, isoleucine, methionine and the like and one or more phospholipids, for example, 1,2-dipalmitoyl-sn-glycero-3-phosphocholine (DPPC) or 1,2-distearoyl-sn-glycero-3-phosphocholine (DSPC) prior to spray drying in amounts up to about 25% (w/w), ranging from about 1% (w/w) to about 25%, or 2.5% to 20% (w/w), or 5% to 15% (w/w). In this embodiment, the inhalers can discharge from about 50% to 100% of the composition in a single inhalation. In this embodiment, the compositions can be administered to a subject in need of treatment as needed.

In an embodiment wherein epinephrine is used as an active agent, the content of the epinephrine composition comprises up to about 30% (w/w); and ranging from about 1% to about 35% of the powder content. In certain embodiments, compositions comprising microcrystalline particles can contain from about 2% to about 30% or from about 0.1% to about 20% (w/w) epinephrine. In this embodiment, epinephrine powders can be delivered with an inhaler described herein with a delivery efficiency of the powder greater than 50% of the dose content. In this embodiment, the compositions are used for a method of treating symptoms of an allergic response, prior to onset of anaphylaxis cause by an allergen, such as a nut, including peanut allergens, antibiotics such as penicillin, and other substances. The method comprises, providing to a subject in need of treatment for symptoms of an allergic response and who exhibits early symptoms of anaphylaxis an inhaler comprising a dose of about 1 mg to about 15 mg of a composition effective to prevent the onset of anaphylaxis, and having the subject inhale a dose of a composition comprising epinephrine in amounts sufficient to prevent onset of anaphylaxis in the subject.

In an embodiment wherein treprostinil is used as an active agent, the dry powder compositions comprise microcrystalline particles of fumaryl diketopiperazine, wherein the treprostinil is adsorbed to the particles and wherein the content of the treprostinil in the composition comprises up to about 20% (w/w) and ranges from about 0.5% to about 10% (w/w), or from about 1% to about 5% (w/w) of the dry powder. In one embodiment, the composition herein can comprise other excipients suitable for inhalation such as amino acids including methionine, isoleucine and leucine. In this embodiment, the treprostinil composition can be used in the prevention and treatment of pulmonary hypertension by self-administering an effective dose comprising about 1 mg to 15 mg of a dry powder composition comprising microcrystalline particles of fumaryl diketopiperazine and treprostinil in a single inhalation.

In an embodiment wherein palonosetron is used as an active agent for inhalation powders, the dry powder content of the palonosetron in the composition comprises up to about 20% (w/w) and ranges from about 0.1% to about 20%, or 0.1% to about 10% of the dry powder content. In one embodiment, palonosetron compositions can be made comprising fumaryl diketopiperazine disodium salt or crystalline composite particles of fumaryl diketopiperazine and an excipient including an amino acid such as leucine, isoleucine or methionine to improve storage stability to the composition. In this embodiment, the palonosetron inhalable composition can be used in the prevention and treatment of chemotherapy-induced nausea and vomiting by self-administering in a single inhalation using an inhaler herein a dose of the composition from about 5 to 30 minutes and preferably from about 5 to 15 minutes prior to or concurrently with the patient receiving the dose of the chemotherapy.

In alternate embodiments, the pharmaceutically acceptable carrier for making dry powders can comprise any carriers or excipients useful for making dry powders and which are suitable for pulmonary delivery. Example of suitable carriers and excipients include, sugars, including saccharides and polysaccharides, such as lactose, mannose, sucrose, mannitol, trehalose; citrates, amino acids such as glycine, L-leucine, isoleucine, trileucine, tartrates, methionine, vitamin A, vitamin E, zinc citrate, trisodium citrate, zinc chloride, polyvinylpyrrolidone, polysorbate 80, phospholipids including diphosphotidylcholine and the like.

In one embodiment, a method of self-administering a dry powder formulation to one's lung(s) with a dry powder inhalation system is also provided. The method comprises: obtaining a dry powder inhaler in a closed position and having a mouthpiece; obtaining a cartridge comprising a pre-metered dose of a dry powder formulation in a containment configuration; opening the dry powder inhaler to install the cartridge; closing the inhaler to effectuate movement of the cartridge to a dose position; placing the mouthpiece in one's mouth, and inhaling once deeply to deliver the dry powder formulation.

In still yet a further embodiment, a method of treating obesity, hyperglycemia, insulin resistance, pulmonary hypertention, anaphylaxis, and/or diabetes is disclosed. The method comprises the administration of an inhalable dry powder composition or formulation comprising, for example, a diketopiperazine having the formula 2,5-diketo-3,6-di(4-X-aminobutyl)piperazine, wherein X is selected from the group consisting of succinyl, glutaryl, maleyl, and fumaryl. In this embodiment, the dry powder composition can comprise a diketopiperazine salt. In still yet another embodiment, there is provided a dry powder composition or formulation, wherein the diketopiperazine is 2,5-diketo-3,6-di-(4-fumaryl-aminobutyl)piperazine, with or without a pharmaceutically acceptable carrier, or excipient.

An inhalation system for delivering a dry powder formulation to a patient's lung(s) is provided, the system comprising a dry powder inhaler configured to have flow conduits with a total resistance to flow in a dosing configuration ranging in value from 0.065 to about 0.200 (kPa)/liter per minute.

In one embodiment, a dry powder inhalation kit is provided comprising a dry powder inhaler as described above, one or more medicament cartridges comprising a dry powder formulation for treating a disorder or disease such as respiratory tract and lung disease, diabetes and obesity.

Methods of treating a disease or disorder in a patient with the dry powder inhaler embodiments disclosed herewith is also provided. The method of treatment comprises providing to a patient in need of treatment a dry powder inhaler comprising a cartridge containing a dose of an inhalable formulation comprising an active ingredient selected from the group as described above and a pharmaceutical acceptable carrier and/or excipient; and having the patient inhale through the dry powder inhaler deeply for about 3 to 4 seconds to deliver the dose. In the method, the patient can resume normal breathing pattern thereafter.

The following examples illustrate some of the processes for making dry powders suitable for using with the inhalers described herein and data obtained from experiments using the dry powders.

Example 1

Preparation of surfactant-free dry powder comprising FDKP microcrystalline powder for use with inhalers: In an example embodiment, surfactant free dry-powders comprising FDKP microcrystalline particles were prepared. Using a dual-feed high shear mixer, approximately equal masses of acetic acid solution (Table 1) and FDKP solution (Table 2) held at about 25° C.±5° C. were fed at 2000 psi through a 0.001-in2 orifice to form a precipitate by homogenization.

The precipitate was collected in deionized (DI) water of about equal temperature. The wt % content of FDKP microcrystallites in the suspension is about 2-3.5%. The suspension FDKP concentration can be assayed for solids content by an oven drying method. The FDKP microcrystallite suspension can be optionally washed by tangential flow filtration using deionized water. The FDKP microcrystallites can be optionally isolated by filtration, centrifugation, spray drying or lyophilization.

TABLE 1

Composition of FDKP Solution

| Component | Component Range (wt. %) |
|---|---|
| FDKP | 2.5-6.25 |
| 30% NH4OH Solution | 1.6-1.75 |
| Deionized Water | 92-95.9 |

TABLE 2

Composition of Acetic Acid Solution

| Component | Component Range (wt. %) |
|---|---|
| Acetic Acid | 10.5-13.0 |
| Deionized Water | 87.0-89.5 |

Dry powders (A, B, C and D) comprising microcrystalline particles made by the methods described above were tested for various characteristics, including surface area, water content and porosity measurements. Four different powders were used in this experiments. All powders tested had a residual water content of 0.4%. Table 2a demonstrates data obtained from the experiments.

TABLE 2a

| Powder ID | Surface Area BET Surface Area ($m^2/g$) | Pore Volume BJH Adsorption cumulative volume of pores ($cm^3/g$) | Pore Size BJH Adsorption average pore diameter (4 V/A) (nm) |
|---|---|---|---|
| A | 61.3 | 0.43 | 25.1 |
| B | 62.3 | 0.43 | 24.4 |
| C | 63.0 | 0.42 | 23.8 |
| D | 59.0 | 0.44 | 26.2 |

The data in Table 2a show that the surface area of sprayed-dried, bulk dry powder comprising the microcrystalline particles of the samples tested ranged from 59 $m^2/g$ to 63 $m^2/g$. The porosity data indicate that the microcrystalline particles are relatively porous, having average pore volumes of about 0.43 $cm^3/g$ and average pore size ranging from about 23.8 nm to 26.2 nm as determined by BJH adsorption. The porosimetry data indicate that these particles differ from prior art FDKP microparticles which have been shown to have an average pore volume of about 0.36 $cm^3/g$ and average pore size from about 20 nm to about 22.6 nm.

Example 2

Preparation of dry powder comprising microcrystalline FDKP particles containing epinephrine. An approximately 5 wt % solution of epinephrine in about 5% aqueous acetic acid was added to a suspension of FDKP microcrystallites obtained as described in Example 1. Optionally, leucine was also added to the FDKP microcrystallite suspension. The mixture was spray dried using a Buchi B290 spray-dryer equipped with a high efficiency cyclone. Nitrogen was used as the process gas (60 mm). Mixtures were dried using 10-20% pump capacity, 90-100% aspiration rate and an inlet temperature of 170-190° C. The weight % concentrations of epinephrine and leucine in the resultant powders were 2-30% and 0-20%, respectively. Delivery efficiencies of these powders after discharge from a dry powder inhaler ranged between approximately 50% and 80%.

Example 3

Preparation of dry powder comprising microcrystalline FDKP particles containing palonosetron. An approximately 5 wt % solution of palonosetron hydrochloride in DI water was added to a suspension of FDKP microcrystallites obtained as described in Example 1. Optionally, solutions of leucine and methionine in deionized (DI) water were also added. The mixture was titrated with ammonium hydroxide to pH 6.5±0.5. The mixture was spray dried using a Buchi B290 spray-dryer equipped with a high efficiency cyclone. Nitrogen was used as the process gas (60 mm). Mixtures were dried using 10-12% pump capacity, 90-100% aspiration rate, and an inlet temperature of 170-190° C. The weight % concentrations of palonosetron, leucine, and methionine in the resultant powders were 5%, 0-20%, and 0-10%, respectively. Delivery efficiencies of these powders after discharge from a dry powder inhaler ranged between approximately 50% and 70%.

Example 4

Preparation of dry powder comprising microcrystalline FDKP particles containing treprostinil. A solution containing 0.2-1.0 wt % treprostinil in ethyl alcohol was added to a suspension of FDKP microcrystallites obtained as described in Example 1. The mixture was spray dried using a Buchi B290 spray-dryer equipped with a high efficiency cyclone. Nitrogen was used as the process gas (60 mm). Mixture were dried using 10-12% pump capacity, 90-100% aspiration rate, and an inlet temperature of 170-190° C. The weight % concentration of treprostinil in the resultant powder was 0.5-10%. Delivery efficiencies of these powders after discharge from a dry powder inhaler ranged between approximately 50% and 70%.

Example 5

Preparation of dry powder comprising microcrystalline FDKP particles containing Δ9-THC or CBD. Isolated FDKP microcrystalline particles prepared as in Example 1 were suspended in ethyl alcohol. An approximately 1-4 wt % solution of cannabis extract, primarily comprising either Δ9-THC or CBD, in ethanol and the ethanolic suspension of FDKP microcrystallites was added. Optionally, solutions of additives dissolved in ethanol were also added. The mixture was spray dried using a Buchi B290 spray-dryer equipped with a high efficiency cyclone. Nitrogen was used as the process gas (60 mm). Mixture were dried using 12-15% pump capacity, 70-100% aspiration rate, and an inlet temperature of 110-140° C. The weight % concentrations of Δ9-THC and additional additives are provided in Table 3. Delivery efficiencies of these powders after discharge from a dry powder inhaler ranged between approximately 50% and 70%.

TABLE 3

Composition of microcrystalline FDKP particles containing Δ9-THC or CBD

| Component | Component Range (wt. %) |
|---|---|
| Δ9-THC and/or CBD | 10-40 |
| DPPC | 5-15 |
| DSPC | 5-15 |
| PVP | 0.5-5 |
| PEG | 2 |
| PS-80 | 2 |

Dry powders made by the method described above were tested using a substantially anatomically correct airway (ACA) system as described in U.S. Pat. No. 9,016,147. The dry powders exhibited significant degree of stability at room temperature, for example, at one-month storage, greater than 90% of the THC or CBD remained active with delivery efficiencies ranging from about 35% to about 75% using this method.

The preceding disclosures are illustrative embodiments. It should be appreciated by those of skill in the art that the devices, techniques and methods disclosed herein elucidate representative embodiments that function well in the practice of the present disclosure. However, those of skill in the art should, in light of the present disclosure, appreciate that many changes can be made in the specific embodiments that are disclosed and still obtain a like or similar result without departing from the spirit and scope of the invention.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope are approximations, the numerical values set forth in the specific examples are reported as precisely as possible. Any numerical value, however, inherently contains certain errors necessarily resulting from the standard deviation found in their respective testing measurements.

The terms "a" and "an" and "the" and similar referents used in the context of describing the invention (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided herein is intended merely to better illuminate the invention and does not pose a limitation on the scope otherwise claimed. No language in the specification should be construed as indicating any non-claimed element essential to the practice of the invention.

The use of the term "or" in the claims is used to mean "and/or" unless explicitly indicated to refer to alternatives only or the alternatives are mutually exclusive, although the disclosure supports a definition that refers to only alternatives and "and/or."

Groupings of alternative elements or embodiments disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is herein deemed to contain the group as modified thus fulfilling the written description of all Markush groups used in the appended claims.

Preferred embodiments are described herein, including the best mode known to the inventors for carrying out the invention. Of course, variations on those preferred embodiments will become apparent to those of ordinary skill in the art upon reading the foregoing description. The inventor expects those of ordinary skill in the art to employ such variations as appropriate, and the inventors intend for the invention to be practiced otherwise than specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Specific embodiments disclosed herein may be further limited in the claims using consisting of or consisting essentially of language. When used in the claims, whether as filed or added per amendment, the transition term "consisting of" excludes any element, step, or ingredient not specified in the claims. The transition term "consisting essentially of" limits the scope of a claim to the specified materials or steps and those that do not materially affect the basic and novel characteristic(s). Embodiments so claimed are inherently or expressly described and enabled herein.

Furthermore, numerous references have been made to patents and printed publications throughout this specification. Each of the above cited references and printed publications are herein individually incorporated by reference in their entirety.

Further, it is to be understood that the embodiments disclosed herein are illustrative of the principles of the present invention. Other modifications that may be employed are within the scope of the invention. Thus, by way of example, but not of limitation, alternative configurations may be utilized in accordance with the teachings herein. Accordingly, the present invention is not limited to that precisely as shown and described.

We claim:

1. A drug delivery system comprising:

a breath-actuated dry powder inhaler, said inhaler comprising a mouthpiece, a housing, and a rectangular body having a proximal end being substantially C-shaped, and;

an enclosure, wherein the enclosure is a cartridge with a cup and a lid which are moveable relative to one another in a translational motion;

and a dry powder composition comprising microcrystalline particles of 3,6-bis(N-fumaryl-4-aminobutyl)-2,5-diketopiperazine made from surfactant-free solutions, cannabidiol in an amount from 10% to 40% (w/w) adsorbed onto the microcrystalline particles, wherein the enclosure is configured to hold the dry powder composition;

wherein the body comprises a proximal portion and a distal portion, wherein the body further comprises a mounting area for the enclosure, and the mouthpiece and the housing are movable relative to one another linearly wherein the housing translationally glides over the body in a proximal to distal direction to open the inhaler, or from the distal to proximal direction to close the inhaler, and the body and the housing are operably configured to engage one another by insertion to effectuate the enclosure to be reconfigured to attain an airflow pathway through the enclosure for discharging a powder dose upon an inhalation.

2. A drug delivery system of claim 1, wherein the dry powder inhaler is configured to attain an open or loading position, and a closed or dosing position.

3. A drug delivery system of claim 1, wherein the dry powder inhaler is provided as a reusable inhaler for delivering a single unit dose of an inhalable composition.

4. A drug delivery system of claim 1, wherein the mouthpiece further has an internal volume extending from a first inlet port to an exit port, wherein the internal volume is greater than 0.2 cubic centimeters.

5. The drug delivery system of claim 1, wherein said microcrystalline particles of 3,6-bis(N-fumaryl-4-aminobutyl)-2,5-diketopiperazine comprise a trans isomer content of about 35 to about 65%.

6. The drug delivery system of claim 1, wherein said microcrystalline particles of 3,6-bis(N-fumaryl-4-aminobutyl)-2,5-diketopiperazine comprise a trans isomer content of about 45 to about 63%.

7. The drug delivery system of claim 1, wherein said microcrystalline particles of 3,6-bis(N-fumaryl-4-aminobutyl)-2,5-diketopiperazine comprise a trans isomer content of about 45 to about 60%.

8. A drug delivery system comprising a breath-actuated, dry powder inhaler, said inhaler comprising a mouthpiece, a housing, and a rectangular body having a proximal end being substantially C-shaped, and, an enclosure, wherein the enclosure is a cartridge with a cup and a lid which are moveable relative to one another in a translational motion, and a dry powder pharmaceutical composition comprising microcrystalline particles of 3,6-bis(N-fumaryl-4-aminobutyl)-2,5-diketopiperazine made from surfactant-free solutions, cannabidiol in an amount from 10% to 40% (w/w) adsorbed onto the microcrystalline particles, wherein the cartridge is configured to hold the dry powder pharmaceutical composition, wherein the breath-actuated, dry powder inhaler can be provided as a reusable inhaler for delivering a single unit dose of the dry powder pharmaceutical composition, wherein the body comprises a proximal portion and a distal portion, wherein the body further comprises a mounting area for the enclosure, and the mouthpiece and the housing are movable relative to one another linearly wherein the housing translationally glides over the body in a proximal to distal direction to open the inhaler, or from the distal to proximal direction to close the inhaler, and the body and the housing are operably configured to engage one another by insertion to effectuate the enclosure to be reconfigured to attain an airflow pathway through the enclosure for discharging a powder dose upon an inhalation.

9. The drug delivery system of claim 8, wherein said microcrystalline particles of 3,6-bis(N-fumaryl-4-aminobutyl)-2,5-diketopiperazine comprise a trans isomer content of about 35 to about 65%.

10. The drug delivery system of claim 8, wherein said microcrystalline particles of 3,6-bis(N-fumaryl-4-aminobutyl)-2,5-diketopiperazine comprise a trans isomer content of about 45 to about 63%.

11. The drug delivery system of claim 8, wherein said microcrystalline particles of 3,6-bis(N-fumaryl-4-aminobutyl)-2,5-diketopiperazine comprise a trans isomer content of about 45 to about 60%.

* * * * *